US012717262B2

(12) United States Patent
Kataoka et al.

(10) Patent No.: US 12,717,262 B2

(45) Date of Patent: Aug. 25, 2026

(54) IMAGE FORMING APPARATUS AND SHEET BONDING APPARATUS

(71) Applicant: CANON KABUSHIKI KAISHA, Tokyo (JP)

(72) Inventors: Hiroshi Kataoka, Shizuoka (JP); Takaomi Uezono, Shizuoka (JP); Taku Watanabe, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 56 days.

(21) Appl. No.: 18/669,763

(22) Filed: May 21, 2024

(65) Prior Publication Data

US 2024/0393726 A1 Nov. 28, 2024

(30) Foreign Application Priority Data

May 25, 2023 (JP) ................................ 2023-086347

(51) Int. Cl.
*G03G 15/00* (2006.01)

(52) U.S. Cl.
CPC ..... *G03G 15/6544* (2013.01); *G03G 15/6567* (2013.01); *G03G 2215/00835* (2013.01)

(58) Field of Classification Search
CPC ........... G03G 15/6567; G03G 15/6544; G03G 2215/00835
See application file for complete search history.

(56) References Cited

U.S. PATENT DOCUMENTS

| | | | | |
|---|---|---|---|---|
| 9,110,425 | B2 | 8/2015 | Watanabe et al. | |
| 11,592,757 | B2 | 2/2023 | Yamashita et al. | |
| 11,840,417 | B2 | 12/2023 | Matsuda | |
| 2024/0241463 | A1 | 7/2024 | Sato | |
| 2025/0021037 | A1* | 1/2025 | Yamashita | G03G 15/6564 |
| 2025/0135798 | A1* | 5/2025 | Iwasawa | G03G 15/2064 |

FOREIGN PATENT DOCUMENTS

| | | | |
|---|---|---|---|
| JP | 2004-212855 | A | 7/2004 |
| JP | 2005-215230 | A | 8/2005 |
| JP | 2013-043751 | A | 3/2013 |
| JP | 2015-028592 | A | 2/2015 |
| JP | 2015-171925 | A | 10/2015 |
| JP | 2015-200813 | A | 11/2015 |
| JP | 2022-027018 | A | 2/2022 |

OTHER PUBLICATIONS

Search Report dated Oct. 28, 2024, in European Patent Application No. 24177284.7.

* cited by examiner

*Primary Examiner* — David H Banh
(74) *Attorney, Agent, or Firm* — Venable LLP

(57) ABSTRACT

An image forming apparatus includes an image forming portion, and a bonding portion including a pressurizing member and configured to bond sheets together. The bonding portion is configured to, in a state in which a succeeding sheet is stacked on a sheet stack that has been bonded in a previous bonding operation, perform a next bonding operation to bond a first surface of an uppermost sheet of the bonded sheet stack to a second surface of the succeeding sheet opposing the first surface. An amount of bonding toner that the image forming portion applies on the first surface per unit area of the first surface is smaller than an amount of the bonding toner that the image forming portion applies on the second surface per unit area of the second surface.

30 Claims, 18 Drawing Sheets

IMAGE FORMING APPARATUS AND SHEET BONDING APPARATUS

BACKGROUND OF THE INVENTION

Field of the Invention

The present invention relates to an image forming apparatus that forms an image on a sheet, and a sheet bonding apparatus that bonds sheets together.

Description of the Related Art

Japanese Patent Application Laid-Open No. 2013-43751 discloses an image forming apparatus that forms a bonding toner pattern on a sheet in addition to a visible image for recording information by an electrophotographic process and bonds sheets together via the bonding toner pattern by stacking the sheets and heating the sheet stack. Japanese Patent Application Laid-Open No. 2005-215230 discloses an image forming apparatus that manufactures a sheet material bundle of a larger sheet number by repeating an operation of heating and pressurizing sheet materials, on each of which a bonding toner layer is formed, by a heating pressurizing member. The operation of heating and pressurizing is performed on three sheet materials at a time.

SUMMARY OF THE INVENTION

The present invention provides an image forming apparatus that can change a toner amount at a bonded portion as necessary can be provided.

According to an aspect of the invention, an image forming apparatus includes an image forming portion configured to form an image on a sheet and apply bonding toner on the sheet, and a bonding portion including a pressurizing member and configured to bond sheets together via the bonding toner by performing a bonding operation of pressurizing and heating a sheet stack by the pressurizing member, wherein the bonding portion is configured to, in a state in which a succeeding sheet is stacked on a sheet stack that has been bonded in a previous bonding operation, perform a next bonding operation to bond a first surface of an uppermost sheet of the bonded sheet stack to a second surface of the succeeding sheet opposing the first surface, the next bonding operation and the previous bonding operation each being the bonding operation, and wherein an amount of the bonding toner that the image forming portion applies on the first surface per unit area of the first surface is smaller than an amount of the bonding toner that the image forming portion applies on the second surface per unit area of the second surface.

According to another aspect of the invention, an image forming apparatus includes an image forming portion configured to form an image and a bonding toner image on a sheet, and a bonding portion configured to bond sheets together via the bonding toner image by pressurizing and heating a sheet stack, and wherein the image forming portion is configured to form the image in an image region on the sheet by using toner, and form the bonding toner image in a bonding region on the sheet different from the image region by using the toner, and wherein a toner amount per unit area in the bonding region is different from a toner amount per unit area in the image region.

According to another aspect of the invention, a sheet bonding apparatus includes an application portion configured to apply bonding toner on a sheet, and a bonding portion including a pressurizing member and configured to bond sheets together via the bonding toner by performing a bonding operation of pressurizing and heating a sheet stack by the pressurizing member, wherein the bonding portion is configured to, in a state in which a succeeding sheet is stacked on a sheet stack that has been bonded in a previous bonding operation, perform a next bonding operation to bond a first surface of an uppermost sheet of the bonded sheet stack to a second surface of the succeeding sheet opposing the first surface, the next bonding operation and the previous bonding operation each being the bonding operation, and wherein an amount of the bonding toner that the application portion applies on the first surface per unit area of the first surface is smaller than an amount of the bonding toner that the application portion applies on the second surface per unit area of the second surface.

According to another aspect of the invention, a n image forming apparatus includes an image forming portion configured to form an image on a sheet and apply bonding toner on the sheet, and a bonding portion including a pressurizing member and configured to bond sheets together via the bonding toner by performing a bonding operation of pressurizing and heating a sheet stack by the pressurizing member, wherein the bonding portion is configured to, in a state in which a succeeding sheet is stacked on a sheet stack bonded in a previous bonding operation, perform a next bonding operation to bond a first surface of an uppermost sheet of the bonded sheet stack to a second surface of the succeeding sheet opposing the first surface, the next bonding operation and the previous bonding operation each being the bonding operation, and wherein a toner density of the bonding toner that the image forming portion applies on the first surface is lower than a toner density of the bonding toner that the image forming portion applies on the second surface.

According to another aspect of the invention, an image forming apparatus includes an image forming portion configured to form an image on a sheet and apply bonding toner on the sheet, and a bonding portion including a pressurizing member and configured to bond sheets together via the bonding toner by performing a bonding operation of pressurizing and heating a sheet stack by the pressurizing member, wherein the bonding portion is configured to, in a state in which a succeeding sheet is stacked on a sheet stack bonded in a previous bonding operation, perform a next bonding operation to bond a first surface of an uppermost sheet of the bonded sheet stack to a second surface of the succeeding sheet opposing the first surface, the next bonding operation and the previous bonding operation each being the bonding operation, and wherein a thickness of a layer of the bonding toner that the image forming portion forms on the first surface is smaller than a thickness of a layer of the bonding toner that the image forming portion forms on the second surface.

Further features of the present invention will become apparent from the following description of exemplary embodiments with reference to the attached drawings.

DESCRIPTION OF THE EMBODIMENTS

Embodiments according to the present disclosure will be described below with reference to drawings.

First Embodiment

Overall Configuration of Image Forming Apparatus

Figure 1:
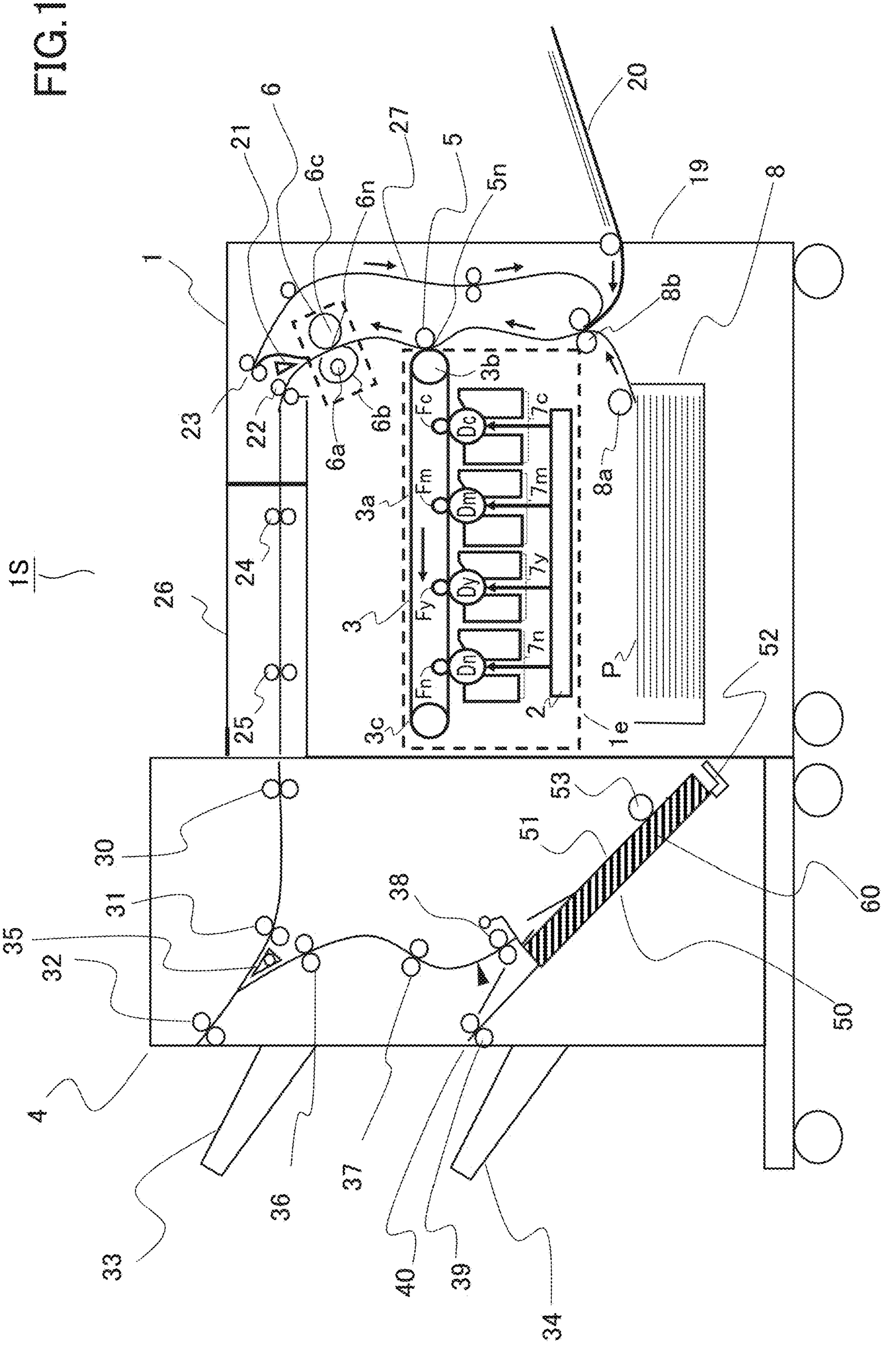
FIG. 1 is a schematic view of an image forming apparatus according to a first embodiment.

First, the overall configuration of an image forming apparatus will be described with reference to FIG. 1. FIG. 1 is a schematic diagram illustrating a cross-sectional configuration of an image forming apparatus 1S according to the first embodiment.

The image forming apparatus 1S includes a printer portion 1 (image forming apparatus body) including an image forming unit 1*e* of an electrophotographic system, an intermediate conveyance unit 26 coupled to the printer portion 1, and a post-processing apparatus 4 (sheet processing apparatus) coupled to the intermediate conveyance unit 26. The image forming apparatus 1S is an image forming system constituted by a plurality of apparatuses. To be noted, the functions of the apparatuses included in the image forming apparatus 1S of the present embodiment may be disposed in one casing.

As illustrated in FIG. 1, the printer portion 1 includes a cassette 8 accommodating sheets P, an image forming unit 1*e* (enclosed by a broken line) serving as an image forming portion, a fixing unit 6 serving as a fixing portion, and a casing 19 accommodating these. The printer portion 1 has a printing function (image forming function) of forming a toner image on a sheet P fed from the cassette 8, by the image forming unit 1*e*, and performing a fixing process by the fixing unit 6 to form a printed product. To be noted, as the sheet P serving as a recording material (recording medium), a wide variety of sheet materials different in size and materials can be used. Examples of the sheet materials include paper sheets such as plain paper sheets and cardboards, plastic films, cloths, surface-treated sheet materials such as coated paper sheets, and sheet materials of irregular shapes such as envelopes and index paper sheets.

In the present embodiment, the maximum size of the sheet P on which an image can be formed by the printer portion 1 is the A4 size (297 mm×210 mm). In addition, the printer portion 1 can perform the image formation by conveying the sheet P of the A4 size in the longitudinal direction (long-side feeding direction, a direction in which the long side of the sheet P of the A4 size is parallel to the sheet conveyance direction).

The image forming unit 1*e* is an electrophotographic unit of a tandem-type intermediate transfer system including four process cartridges 7*n*, 7*y*, 7*m*, and 7*c*, a scanner unit 2 serving as an exposing unit, and a transfer unit 3. The process cartridge is a unit including a plurality of components in charge of an image forming process so as to be collectively replaceable.

The image forming unit 1*e* also functions as an application portion that applies an adhesive on the sheet P as will be described later. The image forming apparatus 1S including the image forming unit 1*e* and a booklet making apparatus 50 that will be described later is an example of a sheet bonding apparatus that forms a product in which sheets P are bonded together.

The process cartridges 7*n*, 7*y*, 7*m*, and 7*c* respectively include photosensitive drums Dn, Dy, Dm, and Dc serving as image bearing members, charging rollers, and developing units. The charging rollers each function as a charging portion that charges corresponding one of the photosensitive drums Dn, Dy, Dm, and Dc. The developing units each include a toner accommodating portion that accommodates toner serving as developer and a developing roller serving as a developer bearing member that bears the toner, and each supply toner to corresponding one of the photosensitive drums Dn, Dy, Dm, and Dc.

Among the four process cartridges 7*n*, 7*y*, 7*m*, and 7*c*, the three process cartridges 7*y*, 7*m*, and 7*c* on the right side in the drawing are process cartridges for forming a visible image on the sheet P. The process cartridges 7*y*, 7*m*, and 7*c* respectively form yellow, magenta, and cyan toner images. The yellow, magenta, and cyan toners accommodated in the process cartridges 7*y*, 7*m*, and 7*c* are each image toner for forming an image on the sheet P (recording toner for recording information).

In contrast, the process cartridge 7*n* on the left side in the drawing is a process cartridge for applying toner for bonding (bonding toner or powder adhesive) that bonds sheets together after printing on the sheet P. The process cartridge 7*n* forms a toner image (bonding toner image) of the bonding toner for applying an adhesive on the sheet P by the electrophotographic process similarly to the process cartridges 7*y*, 7*m*, and 7*c*. That is, part of the plurality of process cartridges 7*n*, 7*y*, 7*m*, and 7*c* included in the image forming unit 1*e* forms a visible image by using toner, and the other part of the cartridges forms an adhesive layer on the sheet P by using the bonding toner. The bonding toner may be colorless transparent toner, or may be colored toner.

In the present embodiment, black is expressed by process black obtained by superimposing yellow, magenta, and cyan toners on each other in the case of forming a black image such as a text. However, for example, a fifth process cartridge including black toner may be added to the image forming unit 1*e* such that a black image can be expressed by black image toner. The configuration is not limited to this, and the types and number of image toner and bonding toner may be changed in accordance with the application of the image forming apparatus 1S.

Scanner Unit

Figure 11:
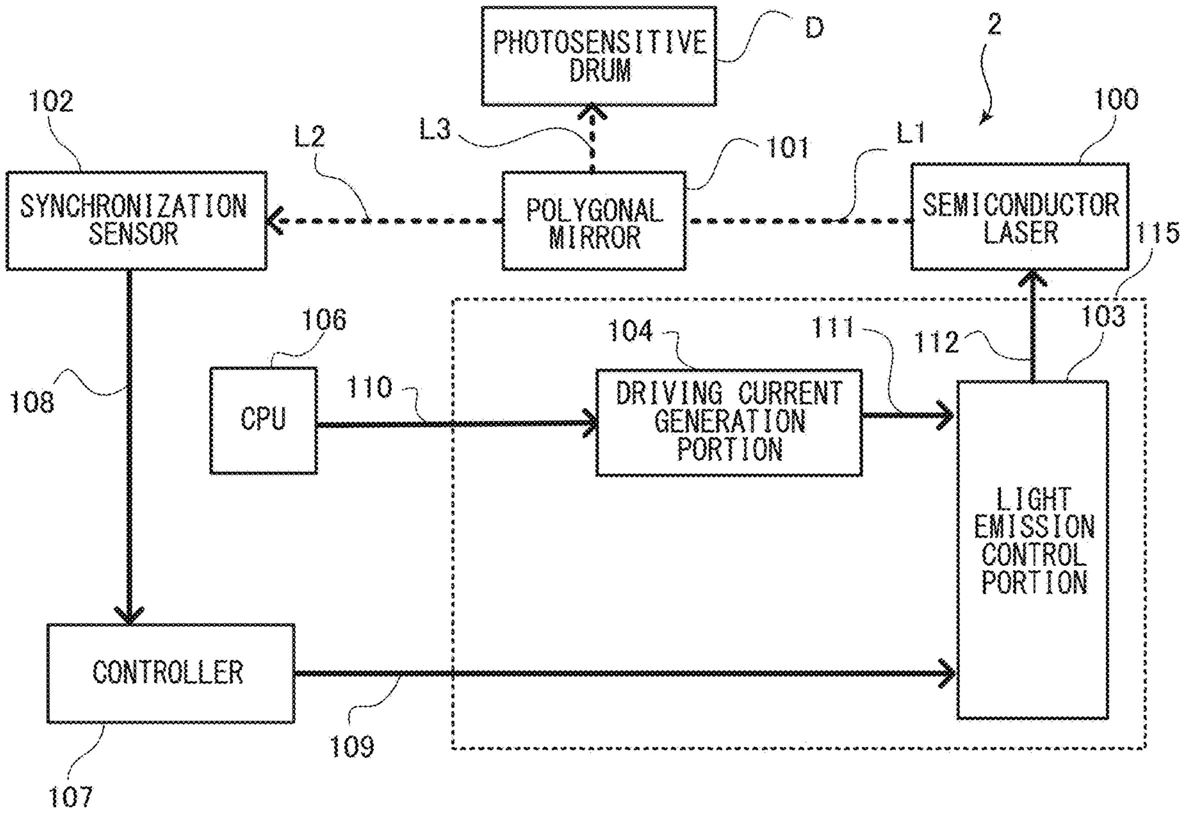
FIG. 11 is a diagram illustrating a driving circuit of a scanner unit according to the first embodiment.

A laser driving circuit incorporated in the scanner unit 2 will be described. FIG. 11 is a block diagram illustrating an electric circuit of a laser driving circuit 115.

The scanner unit 2 is an example of an exposing portion that forms electrostatic latent images by performing exposure by irradiating the photosensitive drums Dn, Dy, Dm, and Dc of the process cartridges 7*n*, 7*y*, 7*m*, and 7*c* with light, respectively. The scanner unit 2 includes a semiconductor laser 100 serving as a light source, a polygonal mirror 101, a synchronization sensor 102, and the laser driving circuit 115. The laser driving circuit 115 includes a light emission control portion 103, and a driving current generation portion 104. Four sets of the semiconductor laser 100, the synchronization sensor 102, and the laser driving circuit 115 are provided in correspondence with the four photosensitive drums Dn, Dy, Dm, and Dc. FIG. 11 illustrates a circuit of one set corresponding to a photosensitive drum D that is an arbitrary one of the four photosensitive drums Dn, Dy, Dm, and Dc.

Laser light L1 emitted from the semiconductor laser 100 is reflected by the polygonal mirror 101 that is rotationally driven. The surface of the photosensitive drum D is scanned by reflected scanning light L3 in a main scanning direction via an unillustrated fθ lens. In addition, as a result of light L2 scanning the synchronization sensor 102, a main scanning synchronization signal 108 is output from the synchronization sensor 102. The light L2 is part of the laser light L1 emitted from the semiconductor laser 100.

The image forming apparatus 1S includes a controller 107 serving as a controller that controls the image forming apparatus 1S, and a central processing unit: CPU 106. The controller 107 outputs an image signal 109 corresponding to each color on the basis of the main scanning synchronization signal 108 to the light emission control portion 103. The light emission control portion 103 outputs a laser driving current 112 that is a current supplied to the semiconductor laser 100 in accordance with the image signal 109, and controls the drive of the semiconductor laser 100.

The CPU 106 performs serial communication with the driving current generation portion 104 via a serial communication signal 110. The driving current generation portion 104 outputs a laser driving current amount signal 111 on the basis of information transmitted from the CPU 106, and controls the current amount of the laser driving current 112. The laser driving current 112 is controlled to a current amount based on the laser driving current amount signal 111. The laser light emitted from the scanner unit 2 of the present embodiment onto the photosensitive drum D is of a predetermined light amount regardless of the position in the main scanning direction.

Image Toner

As the image toner of the present embodiment, known image toner can be used. Among those, image toner containing thermoplastic resin as binder resin is preferred. The thermoplastic resin is not particularly limited, and resins conventionally used for image toner, such as polyester resin, vinyl resin, acrylic resin, and styrene acrylic resin can be used. The image toner may contain a plurality of these resins. The image toner contains a colorant, a magnetic body, a charge control agent, a wax, an external additive, and the like.

Bonding Toner

As the bonding toner of the present embodiment, toner containing thermoplastic resin can be used. The resin that can be used for the thermoplastic resin is not particularly limited, and examples thereof include polyester resin, vinyl resin, acrylic resin, styrene acrylic resin, and the like similarly to the image toner. The bonding toner may contain a plurality of these resins. The bonding toner may contain a colorant, a magnetic body, a charge control agent, a wax, an external additive, and the like similarly to the image toner. In addition, the same toner as the image toner may be used as the bonding toner if the toner satisfies the adhesivity.

Transfer Unit

The transfer unit 3 of the present embodiment includes a transfer belt 3*a* serving as an intermediate transfer member (secondary image bearing member), a secondary transfer opposing roller 3*b*, and a driving roller 3*c*. The transfer belt 3*a* is a belt member stretched over the secondary transfer opposing roller 3*b* and the driving roller 3*c*. The transfer belt 3*a* opposes the photosensitive drums Dn, Dy, Dm, and Dc of the process cartridges 7*n*, 7*y*, 7*m*, and 7*c* on the outer peripheral surface thereof. Primary transfer rollers Fn, Fy, Fm, and Fc are disposed on the inner peripheral side of the transfer belt 3*a* at positions respectively corresponding to the photosensitive drums Dn, Dy, Dm, and Dc. The transfer belt 3*a* is conveyed in a counterclockwise direction in the drawing by being rotationally driven by the driving roller 3*c*.

The printer portion 1 includes a secondary transfer roller 5 serving as a transfer member at a position opposing the secondary transfer opposing roller 3*b* with the transfer belt 3*a* therebetween. A transfer nip 5*n* between the secondary transfer roller 5 and the transfer belt 3*a* is a transfer portion (secondary transfer portion) for transferring a toner image from the transfer belt 3*a* to the sheet P.

Fixing Unit

The fixing unit 6 is an example of a fixing portion that fixes the toner image formed on the sheet P to the sheet P. The fixing unit 6 is a unit (image heating unit) of a thermal fixation system that fixes the toner image by heating.

The fixing unit 6 includes a heating roller 6*b* serving as a fixing member, a halogen heater 6*a* serving as a heat source (heating portion) included in the heating roller 6*b*, and a pressurizing roller 6*c* serving as an opposing member opposing the heating roller 6*b*. The heating roller 6*b* is rotationally driven by a drive source. In addition, the heating roller 6*b* and the pressurizing roller 6*c* are in pressure contact by an urging member such as a spring, and thus a fixing nip 6*n* is formed between the heating roller 6*b* and the pressurizing roller 6*c*.

The fixing unit 6 includes a temperature detection element such as a thermistor that detects the temperature of the heating roller 6*b*. The controller of the image forming apparatus 1S adjusts the power supplied to the halogen heater on the basis of the detection signal of the temperature detection element, and thus performs temperature control such that the heating roller 6*b* is at a predetermined target temperature (fixing temperature).

To be noted, the heat source (heating portion) may be a ceramic heater in which a pattern of a heat generating resistor is formed on a ceramic substrate, an induction heating mechanism that generates heat in a conductive layer of the heating roller 6*b* by induction heating, or the like. The fixing member is not limited to the heating roller 6*b* having rigidity, and may be a thin film formed from a resin having high heat resistance such as polyimide resin or polyamide-imide resin, or metal such as stainless steel.

Image Forming Operation

The image forming operation of the printer portion 1 will be described (see FIG. 1). The image forming operation is a series of operation of forming a toner image from image toner on the sheet P and applying the bonding toner in a predetermined bonding region on the sheet P while the printer portion 1 conveys the sheets P one by one. When a print instruction accompanying image data to be printed is input to the image forming apparatus 1S, the controller of the image forming apparatus 1S starts the image forming operation.

When the image forming operation is started, the sheets P accommodated in the cassette 8 are fed one by one from the cassette 8 by the feeding roller 8*a*. In addition, the printer portion 1 is also capable of feeding sheets P set on a multi-purpose tray 20 (manual feed tray) one by one. The fed sheet P is conveyed toward the transfer nip 5*n* by a conveyance roller pair 8*b*.

In the image forming unit 1*e*, in parallel with the feeding of the sheet P, the process cartridges 7*n*, 7*y*, 7*m*, and 7*c* are sequentially driven, and the photosensitive drums Dn, Dy, Dm, and Dc are rotationally driven. The surface of each of the photosensitive drums Dn, Dy, Dm, and Dc is imparted with uniform charge by a charging roller. In addition, the scanner unit 2 irradiates the photosensitive drums Dn, Dy, Dm, and Dc with laser light modulated on the basis of image data, and thus an electrostatic latent image is formed on the surface of each of the photosensitive drums Dn, Dy, Dm, and Dc.

The developing unit of each of the process cartridges 7*n*, 7*y*, 7*m*, and 7*c* carries toner (image toner or bonding toner) serving as developer on the developing roller and supplies the toner to the corresponding one of the photosensitive drums Dn, Dy, Dm, and Dc, and thus the electrostatic latent image is developed into a toner image. To be noted, the bonding toner image formed from bonding toner on the photosensitive drum Dn is different from the toner image of image toner (normal toner image) for printing an image such as a text or a figure on the sheet Pin that the bonding toner image is not aimed at conveying visual information. However, in the description below, the bonding toner image developed by an electrophotographic process to form a bonding toner image in a predetermined pattern on the sheet P will be also treated as one kind of "toner image".

The toner images formed in the process cartridges 7*n*, 7*y*, 7*m*, and 7*c* are transferred from the photosensitive drums Dn, Dy, Dm, and Dc onto the transfer belt 3*a* through primary transfer respectively by electric fields formed between the photosensitive drums Dn, Dy, Dm, and Dc and the primary transfer rollers Fn, Fy, Fm, and Fc. The toner image borne on the transfer belt 3*a* and having reached the transfer nip 5*n* is transferred onto the sheet P fed and conveyed from the cassette 8 thereto, through secondary transfer by an electric field formed between the secondary transfer roller 5 and the secondary transfer opposing roller 3*b*.

Then, the sheet P is conveyed to the fixing unit 6 and subjected to a thermal fixation process. That is, when the sheet P passes through the fixing nip 6*n*, the toner image on the sheet P is heated and pressurized, and thus the image toner and the bonding toner melt. Then, the molten toner solidifies and adheres, and thus the toner image is fixed to the sheet P.

A reverse conveyance flap 21 is disposed downstream of the fixing nip 6*n* in the sheet conveyance direction. The reverse conveyance flap 21 is a guide member for switching the conveyance path of the sheet P on the basis of a simplex/duplex setting designated in the print instruction.

In the case of a simplex mode (simplex printing) in which a toner image is formed on only one surface of the sheet P, the reverse conveyance flap 21 guides the sheet P toward a discharge roller pair 22. In the case of a duplex mode (duplex printing) in which an image is formed on each surface of the sheet P, the reverse conveyance flap 21 guides the sheet P on a front surface of which a toner image has been formed toward a reverse conveyance roller pair 23 (switchback roller pair). The reverse conveyance roller pair 23 performs switchback in which the sheet P is conveyed in a second direction opposite to a first direction after the sheet P is conveyed in the first direction and before the trailing end of the sheet P passes a nip portion of the reverse conveyance roller pair 23. The sheet P switched back by the conveyance roller pair 23 is conveyed through a duplex conveyance path 27 to pass through the transfer nip 5*n* and the fixing nip on again, and thus a toner image is formed on a back surface thereof. The sheet P on the back surface of which a toner image has been formed is guided toward the discharge roller pair 22 by the reverse conveyance flap 21.

The discharge roller pair 22 discharges the sheet P to the outside of the printer portion 1. As a result of this, the image forming operation on one sheet P is completed. In the present embodiment, the sheet P discharged from the discharge roller pair 22 is received by an intermediate conveyance unit 26. The intermediate conveyance unit 26 conveys the sheet P toward the post-processing apparatus 4 by conveyance roller pairs 24 and 25.

Post-Processing Apparatus

As illustrated in FIG. 1, the post-processing apparatus 4 of the present embodiment has a floor-standing configuration. That is, the post-processing apparatus 4 is installed on an installation surface on which the printer portion 1 is installed so as to be arranged in the horizontal direction with the printer portion 1. To be noted, the image forming apparatus 1S may have a configuration in which, for example, the post-processing apparatus 4 including the booklet making apparatus 50 is placed on an upper portion of the printer portion 1.

The post-processing apparatus 4 includes a conveyance path through which the sheet P received from the outside is conveyed, a plurality of conveyance roller pairs arranged along the conveyance path, a booklet making apparatus 50 that forms a booklet by bonding a plurality of sheets P together, an upper discharge tray 33, and a lower discharge tray 34.

In the present embodiment, the plurality of conveyance roller pairs include an inlet roller pair 30, a first roller pair 31, a discharge reverse conveyance roller pair 32, a second roller pair 36, a third roller pair 37, an inner discharge roller pair 38, and a booklet discharge roller pair 39. The inlet roller pair 30, the first roller pair 31, and the discharge reverse conveyance roller pair 32 are disposed on a first conveyance path extending from an inlet port through which the sheet P is received from the outside toward the upper discharge tray 33. The second roller pair 36, the third roller pair 37, and the inner discharge roller pair 38 are disposed on a second conveyance path extending from the discharge reverse conveyance roller pair 32 toward the booklet making apparatus 50. The booklet discharge roller pair 39 is disposed on a third conveyance path extending from the booklet making apparatus 50 toward the lower discharge tray 34.

The upper discharge tray 33 is a supporting portion on which sheets P not subjected to the processing by the booklet making apparatus 50 are supported. The lower discharge tray 34 is a supporting portion on which a booklet having undergone the processing by the booklet making apparatus 50 is supported. The discharge reverse conveyance roller pair 32 is a discharge portion that discharges the sheet P onto the upper discharge tray 33. In addition, the discharge reverse conveyance roller pair 32 is a reverse conveyance portion that switches back the sheet P conveyed through the first conveyance path and feeds the sheet P to the second conveyance path. The booklet discharge roller pair 39 is a discharge portion that discharges the booklet conveyed thereto through a third conveyance path. To be noted, the casing of the post-processing apparatus 4 is provided with a discharge port through which the sheet P is discharged toward the upper discharge tray 33, and a booklet discharge port 40 through which the booklet is discharged toward the lower discharge tray 34.

The operation of the post-processing apparatus 4 will be described. The sheet P conveyed from the intermediate conveyance unit 26 is conveyed to the discharge reverse conveyance roller pair 32 through the inlet roller pair 30 and the first roller pair 31. In the case where not performing the bonding process on the sheet P (not forming the booklet) is set in the print instruction, the sheet P is discharged straight onto the upper discharge tray 33 by the discharge reverse conveyance roller pair 32, and is supported on the upper discharge tray 33.

In the case where performing the bonding process on the sheet P (forming the booklet) is set in the print instruction, the sheet P is switched back by the discharge reverse conveyance roller pair 32. That is, the discharge reverse conveyance roller pair 32 conveys the sheet P in the first direction (discharge direction), and when the trailing end of the sheet P in the first direction passes a reverse conveyance flap 35, the sheet conveyance direction is reversed to a second direction opposite to the first direction, and the sheet P is fed into the second conveyance path. The sheet P passes through the second roller pair 36 and the third roller pair 37, and is discharged to the booklet making apparatus 50 by the inner discharge roller pair 38.

The booklet making apparatus 50 forms a booklet by bonding a plurality of sheets P together by the bonding toner. Details of the booklet making apparatus 50 will be described later. The booklet discharge roller pair 39 discharges the booklet conveyed thereto from the booklet making apparatus 50 to the outside of the post-processing apparatus 4 through the booklet discharge port 40. The discharged booklet is supported on the lower discharge tray 34.

Booklet Making Apparatus

Next, the booklet making apparatus 50 will be described. As illustrated in FIG. 1, the booklet making apparatus 50 includes an intermediate supporting portion 51 serving as a supporting portion on which a sheet stack to be processed is supported, an alignment mechanism that aligns the sheet stack supported on the intermediate supporting portion 51, and a heat-and-pressure bonding unit 60 that performs heat-and-pressure bonding of the sheet stack.

The alignment mechanism aligns the sheets conveyed to the intermediate supporting portion 51 to a position to be subjected to the heat-and-pressure bonding (bonding operation) by the heat-and-pressure bonding unit 60. The alignment method of the sheet stack by the alignment mechanism will be described with reference to FIGS. 2A to 2D. FIGS. 2A to 2D illustrate the booklet making apparatus 50 as viewed in a direction (height direction) orthogonal to the sheet supporting surface of the intermediate supporting portion 51. In the description below, a direction following the sheet supporting surface in which the sheet P is conveyed toward the intermediate supporting portion 51 will be referred to as a "longitudinal direction" or an "X direction", and a direction following the sheet supporting surface and orthogonal to the longitudinal direction (X direction) will be referred to as a "lateral direction" or a "Y direction".

Figure 2A:
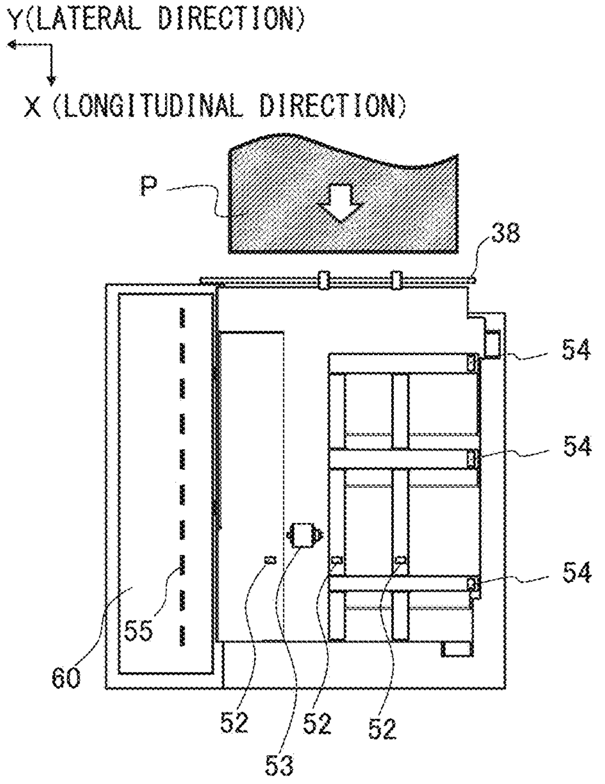
FIGS. 2A to 2D are each a diagram for describing an operation of a booklet making apparatus according to the first embodiment.

As illustrated in FIG. 2A, the alignment mechanism includes longitudinal alignment standard plates 52, a longitudinal alignment roller 53, lateral alignment standard plates 55, and lateral alignment claws 54. The longitudinal alignment standard plates 52 serve as a standard for the sheet position in the longitudinal direction. The lateral alignment standard plates 55 serve as a standard for the sheet position in the lateral direction. The longitudinal alignment roller 53 is an example of a first moving member that moves the sheet P toward the longitudinal alignment standard plates 52. The lateral alignment claws 54 are an example of a second moving member that moves the sheet P toward the lateral alignment standard plates 55.

Figure 2B:
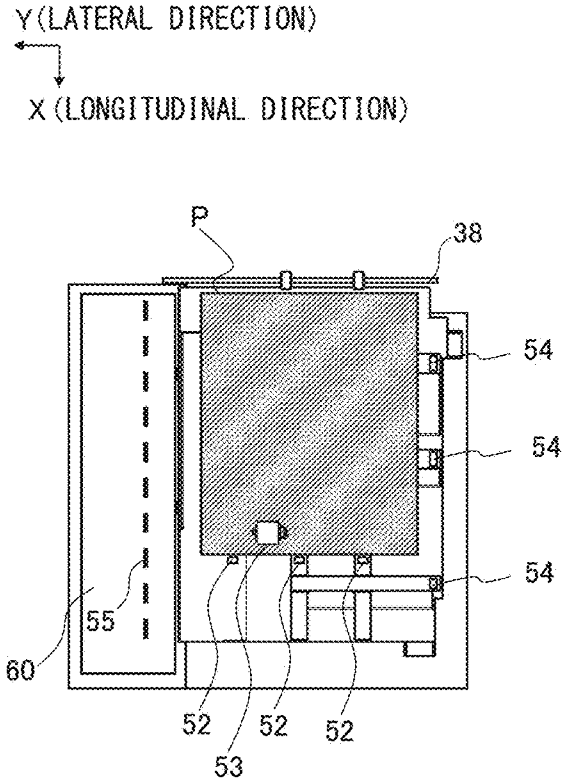

As illustrated in FIG. 2A, the sheet P conveyed to the inner discharge roller pair 38 is discharged onto the intermediate supporting portion 51 by the inner discharge roller pair 38. As illustrated in FIG. 2B, when the trailing end of the sheet P passes the inner discharge roller pair 38 in the longitudinal direction, the longitudinal alignment roller 53 moves the sheet P in the longitudinal alignment direction, and causes an end portion of the sheet P in the longitudinal direction to abut the longitudinal alignment standard plates 52. As a result of this, the position of the sheet P in the longitudinal direction is aligned.

Figure 2C:
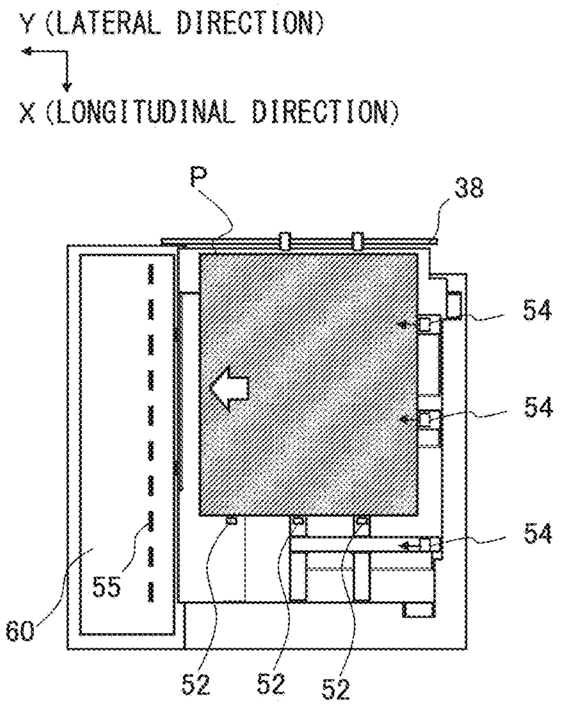
Figure 2D:
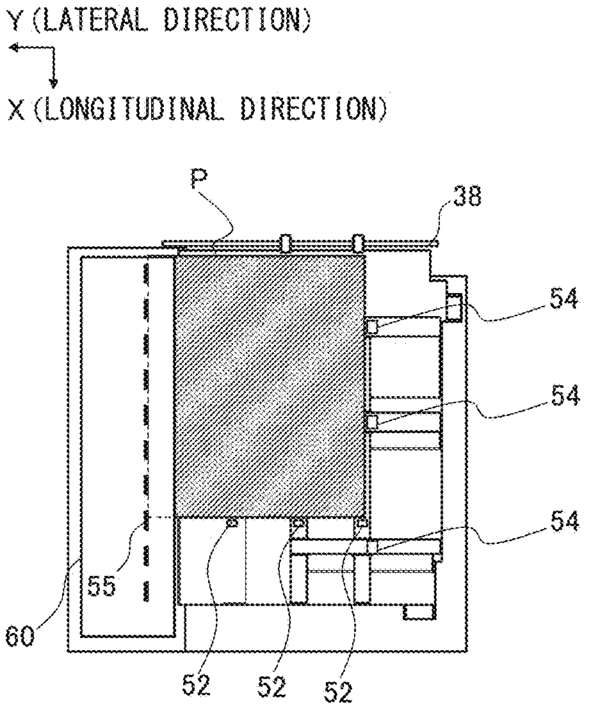

Next, as illustrated in FIG. 2C, the lateral alignment claws 54 abut a first end portion of the sheet P in the lateral direction, and moves the sheet P toward the lateral alignment standard plates 55. Then, as illustrated in FIG. 2D, a second end portion of the sheet P in the lateral direction abuts the lateral alignment standard plates 55. As a result of this, the position of the sheet P in the lateral direction is aligned.

The booklet making apparatus 50 aligns each sheet P of the sheet stack supported on the intermediate supporting portion 51 in the longitudinal direction and the lateral direction as described above. The heat-and-pressure bonding unit 60 that will be described next performs heat-and-pressure bonding on the aligned sheet stack, and thus bonds the sheets together via the bonding toner.

To be noted, although a case where the sheets Pare conveyed one by one to the booklet making apparatus 50 has been described with reference to FIGS. 2A to 2D, a configuration in which a plurality of sheets P stacked in advance is conveyed to the booklet making apparatus 50 may be employed. For example, after a preceding sheet P is switched back by the discharge reverse conveyance roller pair 32, the preceding sheet P is temporarily stopped at the second roller pair 36. Then, the second roller pair 36 conveys the preceding sheet P toward the discharge reverse conveyance roller pair 32 in accordance with a timing at which a succeeding sheet P reaches the discharge reverse conveyance roller pair 32. As a result of this, a sheet stack in which the preceding sheet P and the succeeding sheet P are stacked is formed at the discharge reverse conveyance roller pair 32. In addition, a sheet stack of three or more sheets can be formed by replacing the "preceding sheet P" by a preceding sheet stack that has been already stacked, and by further replacing the "succeeding sheet P" by a further succeeding sheet P. The sheet stack that has been stacked in advance at the discharge reverse conveyance roller pair 32 is conveyed through the second roller pair 36 and the third roller pair 37 and is conveyed onto the intermediate supporting portion 51 by the inner discharge roller pair 38

To be noted, the mechanism that stacks the succeeding sheet on the preceding sheet (stack) while reciprocating the preceding sheet (stack) between the discharge reverse conveyance roller pair 32 and the second roller pair 36 as described above is an example of a buffering mechanism (stacking portion) that conveys a plurality of sheets toward the intermediate supporting portion 51 in a stacked state. A different known mechanism may be used as the buffering mechanism (stacking portion).

In the case where a plurality of sheets in a stacked state is conveyed to the booklet making apparatus 50, the alignment mechanism of the booklet making apparatus 50 can perform the alignment operation as follows. When stacking the plurality of sheets P, the sheets are offset from each other such that a lower sheet P projects more downstream in the longitudinal direction (more toward the longitudinal alignment standard plates 52) than a higher sheet P on the intermediate supporting portion 51. When the trailing end of the lowermost sheet P passes the inner discharge roller pair 38, the longitudinal alignment roller 53 moves the lowermost sheet P in the longitudinal direction to cause the lowermost sheet P to abut the longitudinal alignment standard plates 52. Similarly, each time the trailing end of one upper sheet P passes the inner discharge roller pair 38, the longitudinal alignment roller 53 moves that sheet P in the longitudinal direction and causes the sheet Pto abut the longitudinal alignment standard plates 52. As a result of this, the positions of the plurality of sheets P in the longitudinal direction are aligned. After the positions of the plurality of sheets P in the longitudinal direction are aligned, the lateral alignment claws 54 move the plurality of sheets P toward the lateral alignment standard plates 55, and causes the plurality of sheets P to collectively abut the lateral alignment standard plates 55. As a result of this, the positions of the plurality of sheets P in the lateral direction are aligned.

Heat-and-Pressure Bonding Unit

Figure 3:
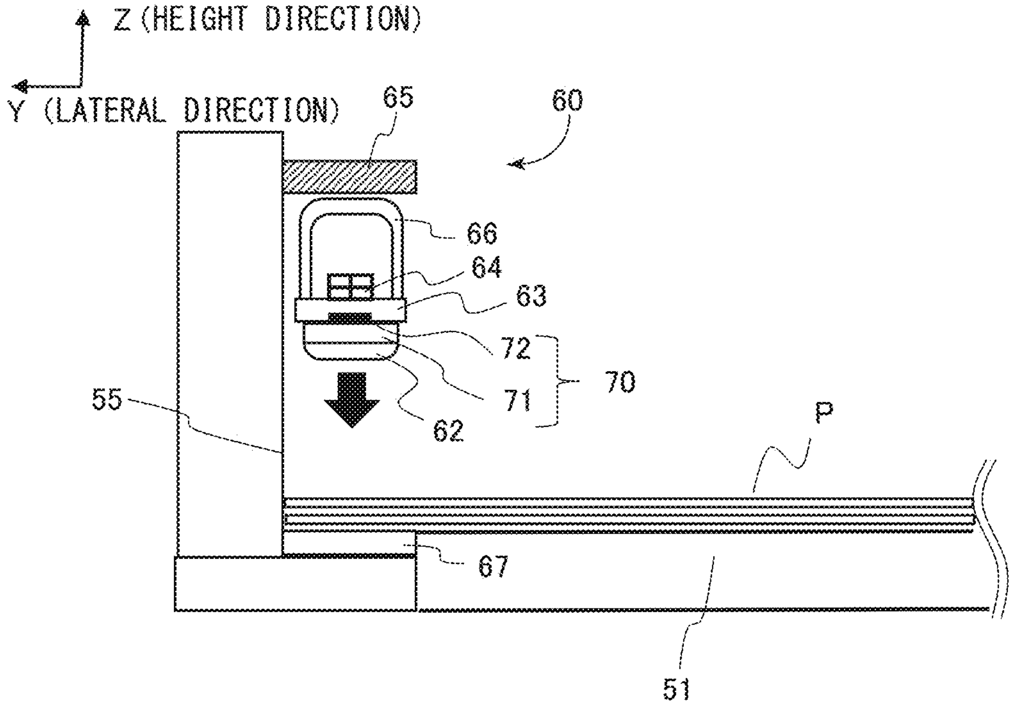
FIG. 3 is a section view of a heat-and-pressure bonding unit according to the first embodiment.

The heat-and-pressure bonding unit 60 of the booklet making apparatus 50 will be described. FIG. 3 is a section view of the heat-and-pressure bonding unit 60 taken along a plane orthogonal to the longitudinal direction (X direction). In the description of the booklet making apparatus 50, a direction orthogonal to the sheet supporting surface of the intermediate supporting portion 51 (direction orthogonal to both the X direction and the Y direction) will be referred to as a "height direction" or a "Z direction". In addition, in the description of the booklet making apparatus 50, "downward" indicates a direction downward in the height direction (Z direction), and "upward" indicates a direction upward in the height direction (Z direction) unless otherwise described.

The heat-and-pressure bonding unit 60 is an example of a bonding portion that bonds sheets together. The heat-and-pressure bonding unit 60 includes a pressurizing plate 62, a receiving plate 67, a heater 70, a heater support body 63, a metal stay 66, and a pressurizing lever 65. The pressurizing plate 62 is an example of a pressurizing member (first pressurizing member or heating pressurizing member) that pressurizes the sheet P. The receiving plate 67 is an example of a receiving member (second pressurizing member) that receives the pressurizing force of the pressurizing plate 62 and pressurizes the sheets P together with the pressurizing plate 62. The heater 70 is an example of a heating portion (heat source) that heats the pressurizing plate 62.

As the heater 70, a ceramic heater in which heat-generating resistor 72 is formed on a ceramic substrate 71 can be used. The substrate 71 has, for example, a plate shape having a thickness of 1.0 mm. The pressurizing plate 62 is caused to abut a lower surface (surface on the lower side in the drawing) of the heater 70. The pressurizing plate 62 is, for example, a plate member formed from aluminum and having a thickness of 1.5 mm. By designing the heater 70 and the pressurizing plate 62 to have a lower heat capacity in this manner, the power consumption of the heat-and-pressure bonding unit 60 can be reduced. To be noted, for the substrate 71 of the heater 70, a material of high rigidity other than ceramics, such as metal, can be also used.

For the pressurizing plate 62, a material having a low heat capacity and high thermal conductivity for transmitting the heat from the heat source to the sheet P efficiently is suitable. For the pressurizing plate 62, a material having an elastic modulus of 1000 Pa or more at which deformation by pressurizing force during heat-and-pressure bonding is suitable, and preferably a material of a high elastic modulus of 10000 Pa or more is used.

The heater 70 generates heat in response to power supply to the heat-generating resistor 72. A controller provided in the post-processing apparatus 4 controls the power input to the heat-generating resistor 72 on the basis of the temperature detected by a thermistor 64 serving as a temperature detection portion, and thus the pressurizing plate 62 is controlled to a predetermined target temperature suitable for heat-and-pressure bonding of the sheets P. The thermistor 64 of the present embodiment is supported by the heater support body 63, and is in contact with the upper surface of the heater 70 (back surface of the surface of the heater 70 opposing the pressurizing plate 62).

The heater support body 63 supports the heater 70. The heater support body 63 is formed from a material such as liquid crystal polymer that is one of high-heat resistance functional resins. The heater support body 63 is supported by the metal stay 66. The pressurizing plate 62, the heater 70, the heater support body 63, and the metal stay 66 are a movable unit (heater unit) that reciprocates in the Z direction so as to come closer to and away from the receiving plate 67. The metal stay 66 is a reinforcing member (rigid member) that improves the rigidity of the movable unit.

The pressurizing lever 65 is fastened to the metal stay 66, and reciprocates in the Z direction by the driving force of a drive source. As a result of the pressurizing lever 65 moving down the movable unit, the pressurizing plate 62 comes into contact with the uppermost sheet of the sheet stack on the receiving plate 67. In addition, as a result of the pressurizing lever 65 moving up the movable unit, the pressurizing plate 62 moves away (retracts) from the sheet stack on the receiving plate 67.

The receiving plate 67 is, for example, a member formed from silicone rubber and having a plate shape of a thickness of 2.0 mm, and is supported by the frame body of the booklet making apparatus 50 (frame body of the post-processing apparatus 4). The receiving plate 67 has a role of applying a consistent pressurizing force to the sheet stack by receiving the sheet stack pressed by the pressurizing lever 65.

The material of the receiving plate 67 is not limited to silicone rubber. For stably transmitting the pressurizing force to the sheet stack, it is preferable that the material of the receiving plate 67 has an elastic modulus of 1000 Pa or less, which is a value corresponding to deformability of a certain degree, is strong against repeated stress, and is heat-resistant.

The heat-and-pressure bonding unit 60 performs the heat-and-pressure bonding operation (bonding operation) of pressurizing and heating the sheet stack by the pressurizing plate 62. Specifically, in the heat-and-pressure bonding operation, after the pressurizing plate 62 in a state of being heated up to the target temperature in advance is brought into pressure contact with the sheet stack for a predetermined period (for example, 2 seconds), and then the pressurizing plate 62 is separated from the sheet stack. The sheet stack is pressurized by being nipped between the pressurizing plate 62 and the receiving plate 67, and is heated by the pressurizing plate 62 heated by the heat from the heater 70. As a result of the heat-and-pressure bonding operation, the bonding toner applied in the printer portion 1 in advance softens, and thus the sheets are bonded together via the bonding toner serving as an adhesive.

The booklet making apparatus 50 of the present embodiment performs the heat-and-pressure bonding operation once by the heat-and-pressure bonding unit 60 each time a predetermined number of sheets P are stacked, and thus forms a booklet as a product including sheets of a number larger than the predetermined number. That is, the heat-and-pressure bonding unit 60 performs the next heat-and-pressure bonding operation in a state in which a succeeding sheet is stacked on a bonded sheet stack that has been bonded by the previous heat-and-pressure bonding operation, and thus bonds a surface (first surface) of the uppermost sheet of the bonded sheet stack to a surface (second surface) of the succeeding sheet opposing the first surface. As a result of this, the heat-and-pressure bonding unit 60 can form a booklet of a sheet number larger than the number of sheets that can be bonded in one heat-and-pressure bonding operation.

The number (predetermined number) of sheets P subjected to heat-and-pressure bonding in one heat-and-pressure bonding operation by the heat-and-pressure bonding unit 60 can be appropriately changed in consideration of the time required for the heat-and-pressure bonding process and the productivity of the booklet formation. The heat-and-pressure bonding unit 60 may be configured to perform the heat-and-pressure bonding operation once each time one succeeding sheet is stacked on the bonded sheet stack. In the description below, description will be given on the premise that the heat-and-pressure bonding unit 60 performs the heat-and-pressure bonding operation once each time five sheets P are stacked on the intermediate supporting portion 51.

For example, a booklet constituted by fifty sheets P is formed by the following process.

The first heat-and-pressure bonding operation is performed when the first to fifth sheets P are stacked on the intermediate supporting portion 51 and aligned by the alignment mechanism. A bonded sheet stack (hereinafter referred to as a five-sheet provisional booklet) including five sheets P is formed by the first heat-and-pressure bonding operation.

The second heat-and-pressure bonding operation is performed when the sixth to tenth sheets P are stacked on the five-sheet provisional booklet and aligned by the alignment mechanism. A bonded sheet stack (hereinafter referred to as a ten-sheet provisional booklet) including ten sheets P is formed by the second heat-and-pressure bonding operation.

The third heat-and-pressure bonding operation is performed when the eleventh to fifteenth sheets P are stacked on the ten-sheet provisional booklet and aligned by the alignment mechanism. A bonded sheet stack (hereinafter referred to as a fifteen-sheet provisional booklet) including fifteen sheets P is formed by the third heat-and-pressure bonding operation.

After this, similarly, the heat-and-pressure bonding operation is performed once each time five sheets P are stacked on a bonded provisional booklet and aligned by the alignment mechanism. Then, a booklet including fifty sheets P is completed as a product by the tenth heat-and-pressure bonding operation.

To be noted, in the case where sheets P stacked in the buffering mechanism (stacking portion) in advance are conveyed to the booklet making apparatus 50, the number of sheets P stacked in the buffering mechanism (stacking portion) is set to be equal to the number of sheets P subjected to heat-and-pressure bonding by the heat-and-pressure bonding unit 60 by one heat-and-pressure bonding operation. As a result of this, the time required for completing the alignment of a predetermined number of sheets P can be shortened, and thus the interval of the heat-and-pressure bonding operation can be shortened in some case as compared with the case where the booklet making apparatus 50 aligns one by one a plurality of number of sheets P conveyed thereto one by one. Further, the overall productivity of the post-processing apparatus 4 can be improved.

In addition, in the case where the number of sheets included in one copy of booklet is smaller than the predetermined number, the heat-and-pressure bonding operation may be performed when all the sheets P included in one copy of booklet are supported on the intermediate supporting portion 51 and aligned by the alignment mechanism.

The booklet formed by the heat-and-pressure bonding operation by the heat-and-pressure bonding unit 60 is pushed out toward the booklet discharge port 40 (FIG. 1) by the booklet discharge guide included in the booklet making apparatus 50. The booklet discharge guide stops after the leading end of the booklet has reached the booklet discharge roller pair 39, and then returns to the standby position. The booklet discharge roller pair 39 having received the booklet from the booklet discharge guide discharges the booklet from the post-processing apparatus 4 onto the lower discharge tray 34. As a result of this, the series of operations for forming one copy of booklet is finished.

Positional Relationship Between Sheet and Heater

Figure 4:
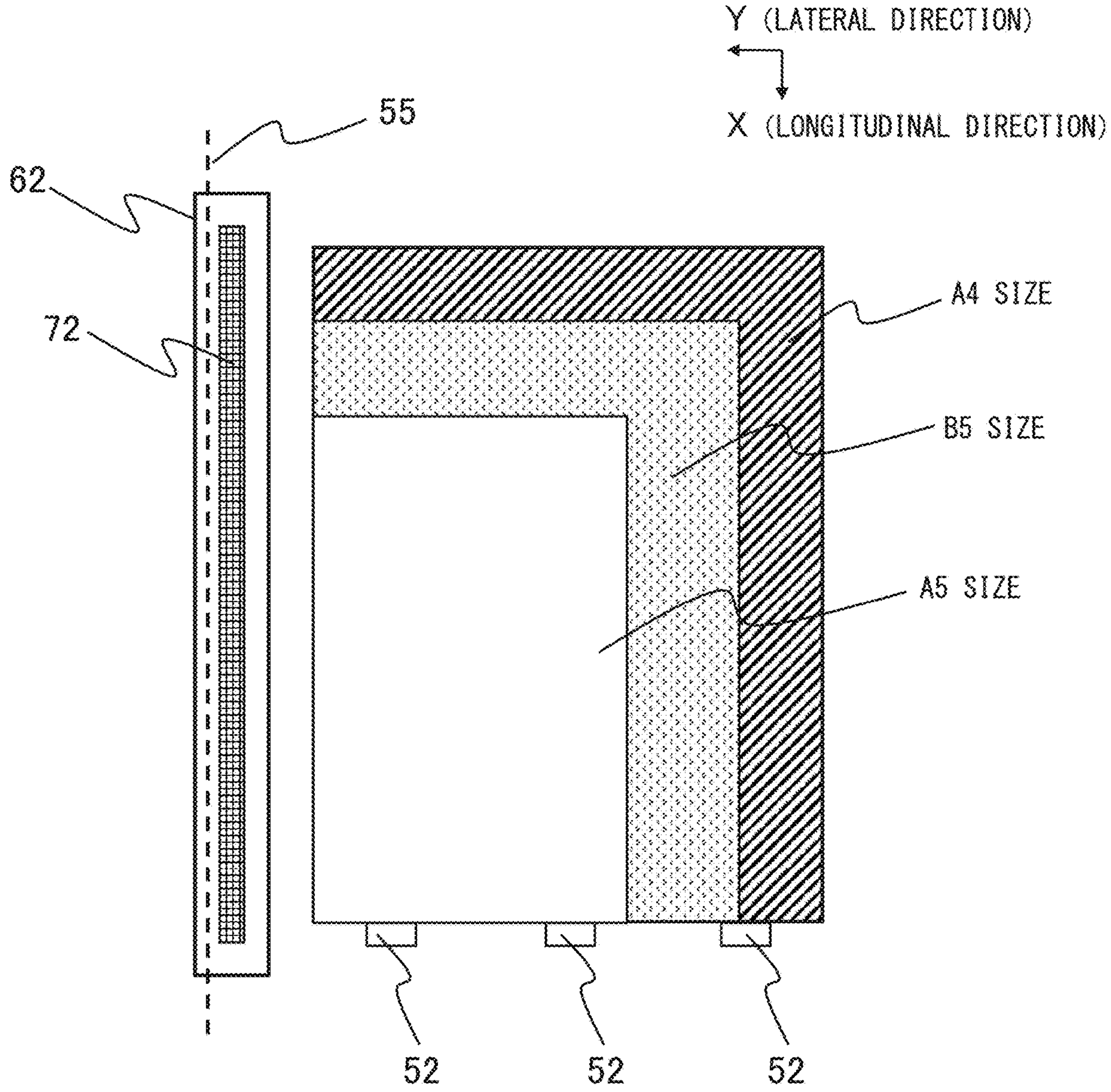
FIG. 4 is a diagram illustrating a sheet position for each size in the first embodiment.

The positional relationship between the sheet P and the heater 70 of the heat-and-pressure bonding unit 60 in the booklet making apparatus 50 will be described with reference to FIG. 4. The size of the sheet P used for forming the booklet can be arbitrarily selected by a user from various sizes. In FIG. 4, the A4 size, the B5 size, and the A5 size are illustrated as examples of the selectable size.

In the present embodiment, the position of the longitudinal alignment standard plates 52 and the position of the lateral alignment standard plates 55 are fixed to preset positions regardless of the size of the sheet P. That is, the standard position in the X direction and the standard position in the Y direction during sheet alignment in the booklet making apparatus 50 are constant regardless of the size of the sheet P.

The heat-and-pressure bonding unit 60 is disposed such that an end portion on the same side as the lateral alignment standard plates 55 of the sheet P can be subjected to heat-and-pressure bonding with respect to the position of the longitudinal alignment standard plates 52 and the position of the lateral alignment standard plates 55. The heater 70 of the present embodiment extends in the X direction from the position of the longitudinal alignment standard plates 52 to a length including the long-side length (297 mm) of the A4 size, and is positioned at a predetermined position with respect to the lateral alignment standard plates 55. As described above, by setting the position and size of the heater 70 with respect to the position of the longitudinal alignment standard plates 52 and the position of the lateral alignment standard plates 55, sheets of various sizes can be more reliably bonded.

Bonding Mode

Figure 5A:
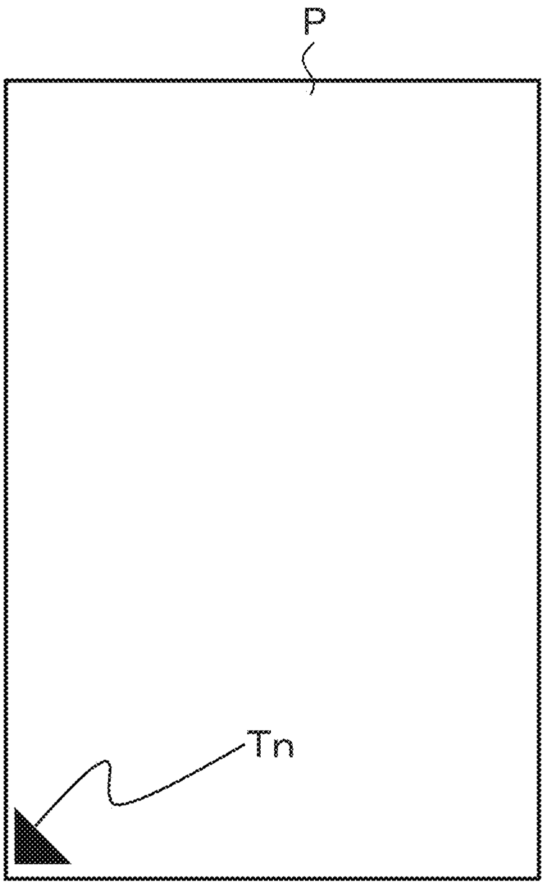
FIGS. 5A and 5B are each a diagram illustrating an example of a bonding region in the first embodiment.
Figure 5B:
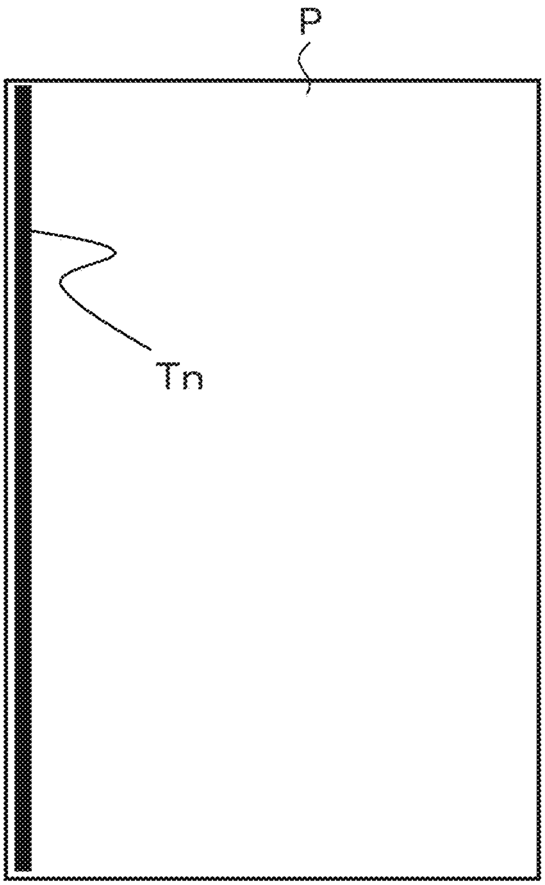

Examples of the bonding mode for different application patterns of bonding toner Tn will be described with reference to FIGS. 5A and 5B. FIG. 5A illustrates a bonding mode of a booklet in which the sheets P are bonded by corner bonding (corner binding) in which a corner portion of the sheets P is bonded by applying the bonding toner Tn on the corner portion. FIG. 5B illustrates a bonding mode of the booklet in which the sheets P are bonded by edge bonding (long-side binding) in which an edge portion of the sheets P is bonded by applying the bonding toner Tn on the edge portion of the left long side of the sheets P. To be noted, the sheets may be bonded together at a corner portion different from the illustrated corner portion, or the sheets may be bonded together at an edge portion of the short side of the sheets P.

In the case of forming a booklet including n sheets P, the printer portion 1 applies the bonding toner Tn in a predetermined bonding region (bonding portion) on each surface of each sheet P excluding the front surface of the first sheet P serving as the front cover of the booklet and the back surface of the n-th sheet P serving as the back cover of the booklet. Further, the booklet making apparatus 50 of the post-processing apparatus 4 forms a booklet in which n sheets P are bonded by repeatedly performing the heat-and-pressure bonding operation by the heat-and-pressure bonding unit 60 each time a predetermined number of sheets P are stacked.

To be noted, although an example in which the bonding toner Tn is applied on each surface of each sheet P has been described herein, a configuration in which the bonding toner Tn is applied on only one surface of each sheet P may be employed. Normally, applying the bonding toner Tn on both surfaces of the sheet P makes the bonding stronger because the sheets are bonded via a sufficient amount of the bonding toner Tn.

Whether the bonding toner Tn is applied on one surface or two surfaces may be appropriately selected in consideration of the performance of the booklet making apparatus 50, the type of the bonding toner Tn or the sheet P, the function desired for the booklet, and the like. For example, in the case of a booklet to be preserved or in the case of using a cardboard or a special sheet P for the front cover or the back cover of the booklet, the bonding toner Tn may be applied on each surface of the sheet P to obtain more reliable adhesion. In the case of a booklet for simple primary use, a configuration in which the bonding toner Tn is applied on only one surface of the sheet P may be employed.

Bonding Force

Figure 6A:
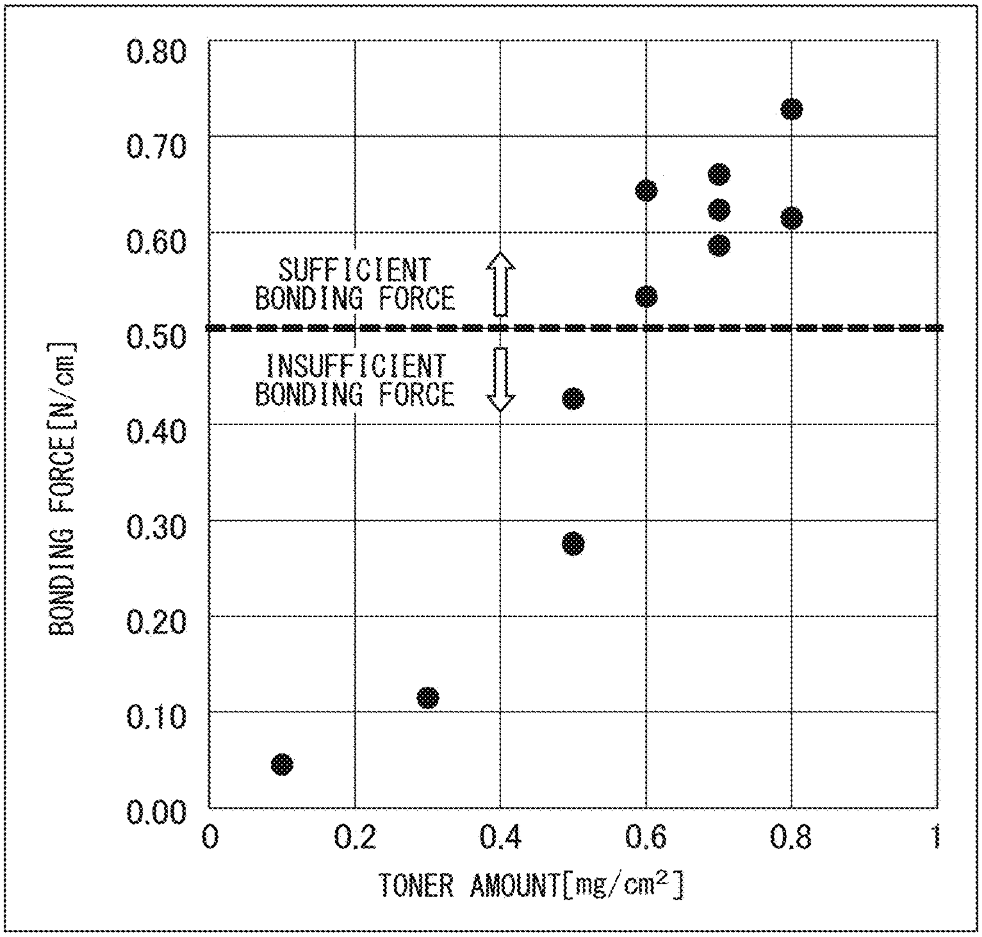
FIG. 6A is a diagram illustrating a relationship between the amount of bonding toner and bonding force in the first embodiment.
Figure 6B:
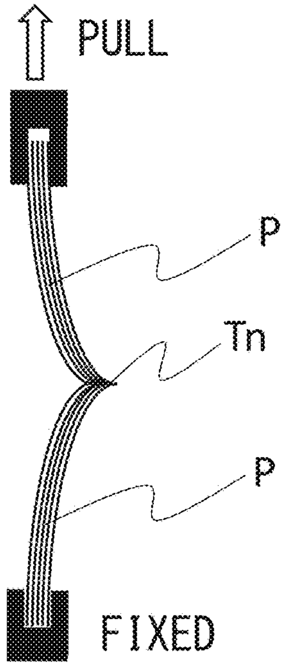
FIG. 6B is a diagram illustrating a method for measuring the bonding force.

FIG. 6A illustrates a result of measuring the relationship between the toner amount of the bonding toner Tn (amount of toner for bonding) and the bonding force. The bonding force mentioned herein is a value measured as a peak force for peeling off two sheets P bonded by heat-and-pressure bonding from each other as illustrated in FIG. 6B. In addition, since the bonding force between sheets P also depends on the area of the bonding region, the bonding force is expressed as a value per unit length of the bonding region (value obtained by dividing the above-described peak force by the length of the bonding region in the X direction. The unit is N/cm). The toner amount is a measured value of toner amount of the bonding toner Tn before being fixed by the fixing unit 6, and is expressed as a toner weight per unit area (unit is $mg/cm^2$).

As illustrated in FIG. 6A, it can be seen that the bonding force is proportional to the toner amount. Meanwhile, as a result of studying the bonding force between the sheets P that is required for the complete booklet, it has been determined that a bonding force of about 0.5 N/cm or more is sufficient for forming the booklet because the sheet P tears before peeling off from another sheet P at the bonding toner Tn layer at this bonding force.

The bonding force of 0.5 N/cm obtained by the studying of this time is confirmed by using a plain paper sheet Office 70 (70 g) available from Canon Marketing Japan Inc. as the sheet P. Although the bonding force described above was confirmed by using several types of sheets P, since the standard for sufficient bonding force can change depending on the type of the sheet and the use of the product, the bonding force may be evaluated by using a value different from 0.5 N/cm as a standard.

As illustrated in FIG. 6A, the amount of the bonding toner Tn required for obtaining the bonding force of 0.5 N/cm or more was 0.6 $mg/cm^2$ or more. That is, in the booklet making apparatus 50 and the image forming apparatus 1S of the present embodiment, sufficient bonding force can be obtained if the bonding toner Tn is applied on one or both of opposing surfaces of sheets P to be bonded together at an application amount of 0.6 $mg/cm^2$ or more in total.

Toner Attachment to Pressurizing Plate

Next, a phenomenon that occurs when forming the booklet will be described. As described above, by applying the bonding toner Tn on opposing surfaces of sheets to be bonded together, the bonding force can be enhanced as compared with a case where the bonding toner Tn is applied on only one surface of each sheet. However, in the case of forming a booklet serving as one copy of booklet by repeating the heating and pressurization by the pressurizing plate 62, the pressurizing plate 62 comes into contact with the bonding toner Tn applied on a surface of the sheet stack (provisional booklet) in the middle of the formation of the booklet, and part of the bonding toner Tn can attach to the pressurizing plate 62. Further, there is a possibility that the bonding toner Tn transfers from the pressurizing plate 62 to a sheet serving as the front cover or the back cover of the booklet to stain the sheet, and thus the quality of the complete booklet is degraded.

Specific description will be given with reference to FIGS. 7A to 7C and 8A to 8C. Here, it is assumed that a booklet including fifty sheets is formed by repeatedly performing the heat-and-pressure bonding operation once each time five sheets P are stacked. To be noted, in the description below, the “front surface” of each sheet P indicates a surface (upper surface) of the sheet P opposing the pressurizing plate 62, and the “back surface” of each sheet P indicates a surface (lower surface) of the sheet P opposing the receiving plate 67.

Figures 7A, 7B, 7C:
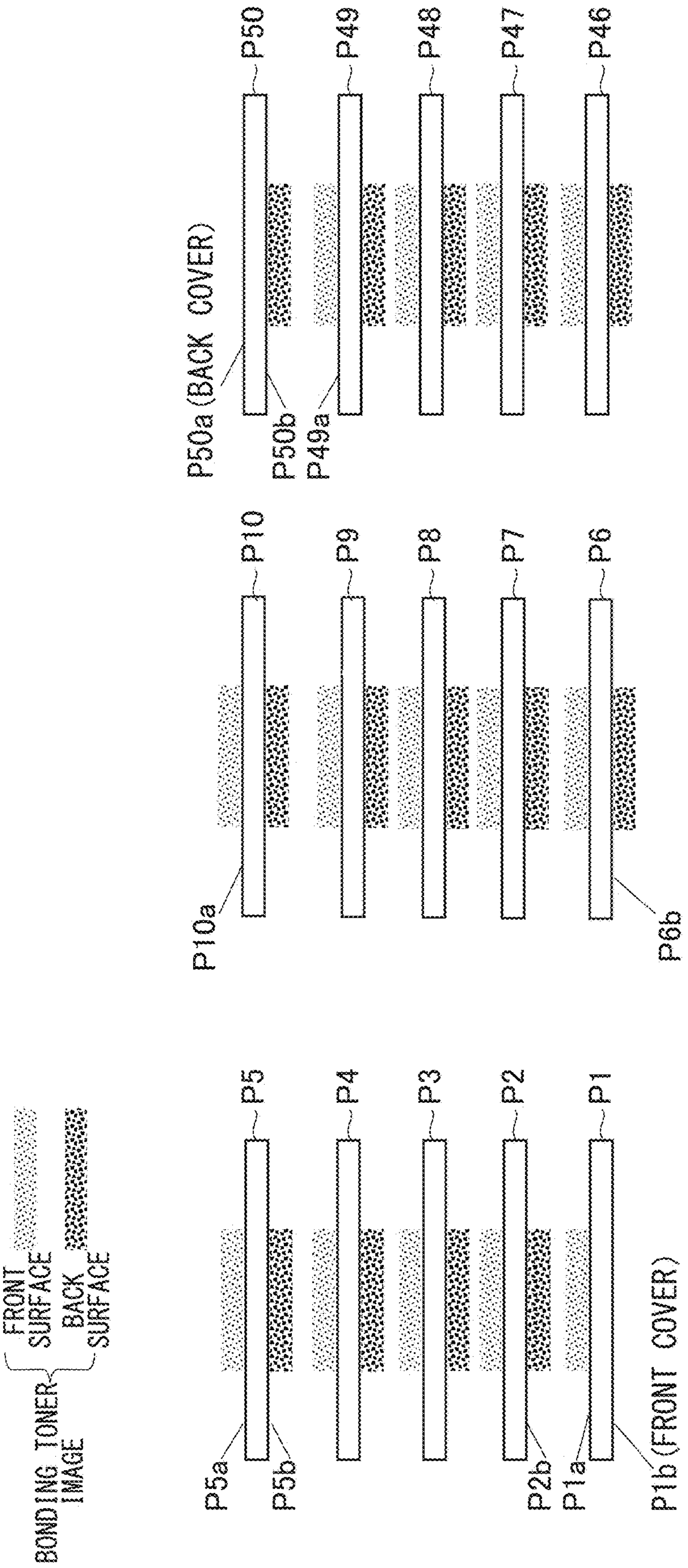
FIGS. 7A to 7C are each a diagram illustrating a booklet making process in the first embodiment.

FIG. 7A is a schematic view of the first to fifth sheets P1 to P5. The bonding toner Tn is not applied on a back surface Plb of the first sheet P1. This is because the back surface P1*b* of the first sheet P1 is a surface serving as the front cover of the complete booklet and is not bonded to other sheets of the booklet. The bonding toner Tn is applied on a front surface Pla of the first sheet P1 because the front surface Pla is a surface to be bonded to a back surface P2*b* of the second sheet P2. The bonding toner Tn is applied on each of the front surface and the back surface of each of the second to fifth sheets P2 to P5. As a result of the first to fifth sheets P1 to P5 being heated and pressurized by the pressurizing plate 62 in the first heat-and-pressure bonding operation, a provisional booklet (five-sheet provisional booklet) including the five sheets P1 to P5 is formed.

FIG. 7B is a schematic view of the sixth to tenth sheets P6 to P10. The bonding toner Tn is applied on each of the front surface and back surface of each of the sixth to tenth sheets P6 to P10. That is, unlike the first sheet P1, the bonding toner Tn is applied on a back surface P6*b* of the sixth sheet P6 because the back surface P6*b* is bonded to a front surface P5*a* of the fifth sheet P5 (upper surface of five-sheet provisional booklet). As a result of the sixth to tenth sheets P6 to P10 stacked on the already bonded five-sheet provisional booklet being heated and pressurized by the pressurizing plate 62 in the second heat-and-pressure bonding operation, a provisional booklet (ten-sheet provisional booklet) including the ten sheets P1 to P10 is formed.

In the description below, similarly, a new provisional booklet is formed as a result of the pressurizing plate 62 heating and pressurizing an already bonded provisional booklet and succeeding sheets stacked on the provisional booklet.

FIG. 7C is a schematic view of forty-sixth to fiftieth sheets P46 to P50 that are subjected to heat-and-pressure bonding in the tenth heat-and-pressure bonding operation (final heat-and-pressure bonding operation). The bonding toner Tn is not applied on a front surface P50*a* of the fiftieth sheet P50. This is because the front surface P50*a* of the fiftieth sheet P50 is a surface serving as the cover on the back side (back cover) of the complete booklet and is not bonded to other sheets of the booklet. The bonding toner Tn is applied on a back surface P50*b* of the fiftieth sheet P50 is a surface because the back surface P50*b* is a surface to be bonded to a front surface P49*a* of the forty-ninth sheet P49. The bonding toner Tn is applied on each of the front surface and the back surface of each of the forty-sixth to forty-ninth sheets P46 to P49. As a result of the forty-sixth to fiftieth sheets P46 to P50 stacked on the already-bonded forty-five-sheet provisional booklet being heated and pressurized by the pressurizing plate 62 in the tenth heat-and-pressure bonding operation, formation of a booklet including the fifty sheets P1 to P50 is completed.

Figure 8A:
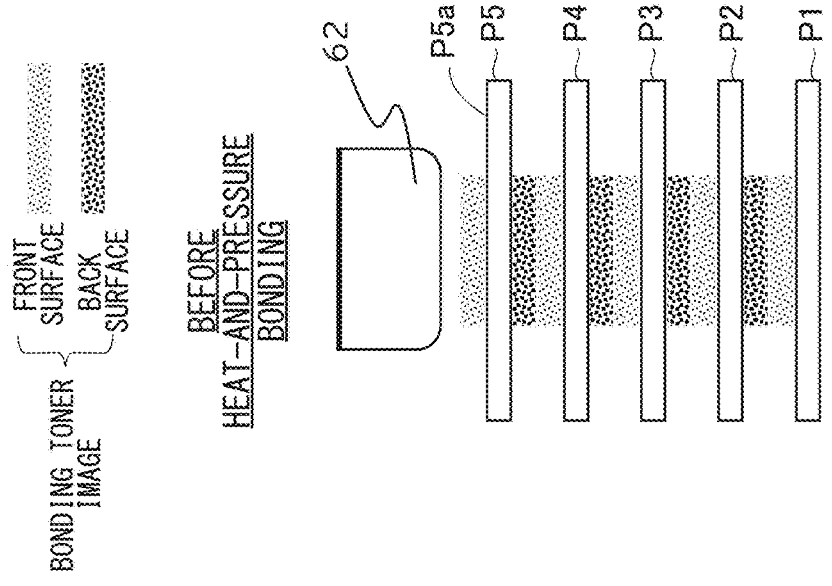
FIGS. 8A to 8C are each a diagram illustrating a booklet making process in the first embodiment.

Here, when forming a provisional booklet, the bonding toner Tn is applied on the front surface of the uppermost sheet of the provisional booklet. Specifically, as illustrated in FIGS. 7A and 8A, the bonding toner Tn is applied on the front surface P5*a* of the fifth sheet P5 that is the uppermost sheet of a five-sheet provisional booklet.

Figure 8B:
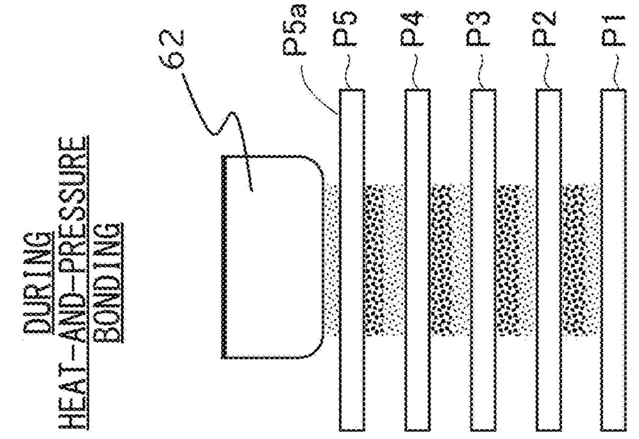
Figure 8C:
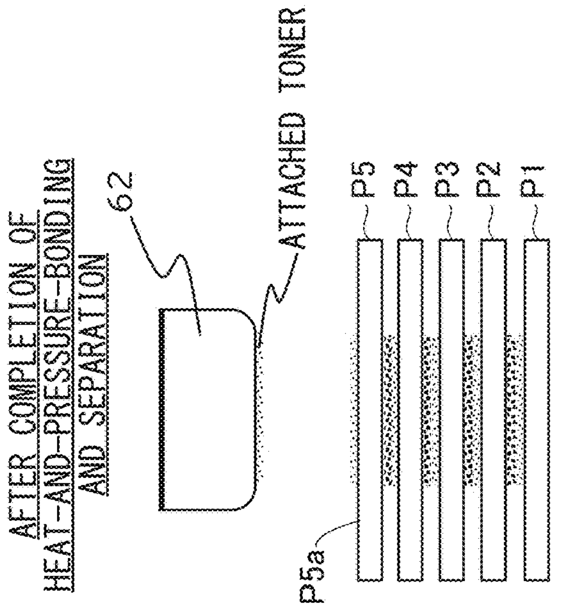

Therefore, as illustrated in FIG. 8B, at the time of the first heat-and-pressure bonding operation, the pressurizing plate 62 comes into contact with the bonding toner Tn exposed on the upper surface of the five-sheet provisional booklet (front surface P5*a*). Further, in the case where the pressurizing plate 62 is separated from the five-sheet provisional booklet after the heat-and-pressure bonding operation, part of the bonding toner Tn can attach to the pressurizing plate 62.

The bonding toner Tn attached to the pressurizing plate 62 comes into contact with the front surface P10*a* (FIG. 7B) of the tenth sheet P10 in the second heat-and-pressure bonding operation. However, since the bonding toner Tn is applied on the front surface P10*a* of the tenth sheet P10, the complete booklet is not stained by the bonding toner Tn attached to the pressurizing plate 62. Similarly, the complete booklet is neither stained by the bonding toner Tn attached to the pressurizing plate 62 in the third to ninth heat-and-pressure bonding operations.

However, in the final heat-and-pressure bonding operation, the pressurizing plate 62 comes int contact with the front surface P50*a* (FIG. 7C) of the fiftieth sheet P50 on which the bonding toner Tn is not applied. Therefore, if the bonding toner Tn attached to the pressurizing plate 62 in the first to ninth heat-and-pressure bonding operations transfer from the pressurizing plate 62 onto the front surface P50*a* of the fiftieth sheet P50 in the final heat-and-pressure bonding operation, the back cover of the complete booklet is stained.

As described above, there is a possibility that the bonding toner Tn attached to the pressurizing plate 62 in the heat-and-pressure bonding operations during the formation of the booklet attaches to a sheet serving as an outer surface (front cover or back cover) of the complete booklet in the final heat-and-pressure bonding operation and the quality of the booklet is degraded.

In the case of using colored toner similar to the image toner as the bonding toner Tn, the bonding toner Tn transferred onto the outer surface of the complete booklet is visualized as colored stain. In addition, also in the case of using colorless or white toner as the bonding toner Tn, there is a case where the stain is visualized as a result of the bonding toner Tn solidifying in a state in which foreign matter such as paper dust and dust is mixed in the bonding toner Tn or as a result of gloss difference from the surrounding regions.

Bonding Toner Amount on Opposing Surfaces of Sheets

Incidentally, the attachment of toner to the pressurizing plate 62 can be avoided if the bonding toner Tn is not applied on the front surface P5*a* of the fifth sheet P5, the front surface P10*a* of the tenth sheet P10, and the like that the pressurizing plate 62 comes into contact with. However, since the bonding force is reduced by reducing the amount of the bonding toner Tn, there is a possibility that the bonding force is insufficient for, for example, the fifth and sixth sheets P5 and P6.

In addition, increasing the toner amount of the bonding toner Tn on the back surface P6*b* of the sixth sheet P6 to obtain sufficient bonding force without applying the bonding toner Tn on the front surface P5*a* of the fifth sheet P5 can be also considered. For example, applying the bonding toner Tn at a toner amount of 0.3 $mg/cm^2$ on other sheets and applying the bonding toner Tn at a toner amount of 0.6 $mg/cm^2$, which is a double value, on the back surface P6*b* of the sixth sheet P6 can be considered.

However, there is a case where it is difficult to develop a toner image by a toner amount of 0.6 $mg/cm^2$ by a single process cartridge 7*n*. In addition, although superimposing toner images developed by a plurality of cartridges on the sheet P to increase the toner amount can be considered, this requires providing a plurality of process cartridges 7*n* using the bonding toner, which can lead to increase in the size and complexity of the image forming apparatus 1S.

Therefore, in the present embodiment, the toner amount of the bonding toner Tn applied on a surface (first surface) of a sheet P that comes into contact with the pressurizing plate 62 during the formation of the booklet is set to be smaller than the toner amount of the bonding toner Tn applied on a surface (second surface) of a sheet P opposing the first surface. In other words, in the present embodiment, the amount of the bonding toner applied on the first surface by the image forming portion is smaller than the amount of the bonding toner applied on the second surface by the image forming portion. More specifically, the amount (unit: $mg/cm^2$) of the bonding toner applied on the first surface by the image forming portion per unit area of the first surface is smaller than the amount of the bonding toner applied on the second surface of the image forming portion per unit area of the second surface. The first surface mentioned herein is a surface of the uppermost sheet of the bonded sheet stack bonded by the previous bonding operation, and the second surface is a surface of a succeeding sheet to be bonded to the first surface. According to this configuration, the possibility of the bonding toner Tn attached to the pressurizing plate 62 in the heat-and-pressure bonding operation during the formation of the booklet staining the complete booklet can be lowered.

Figure 9:
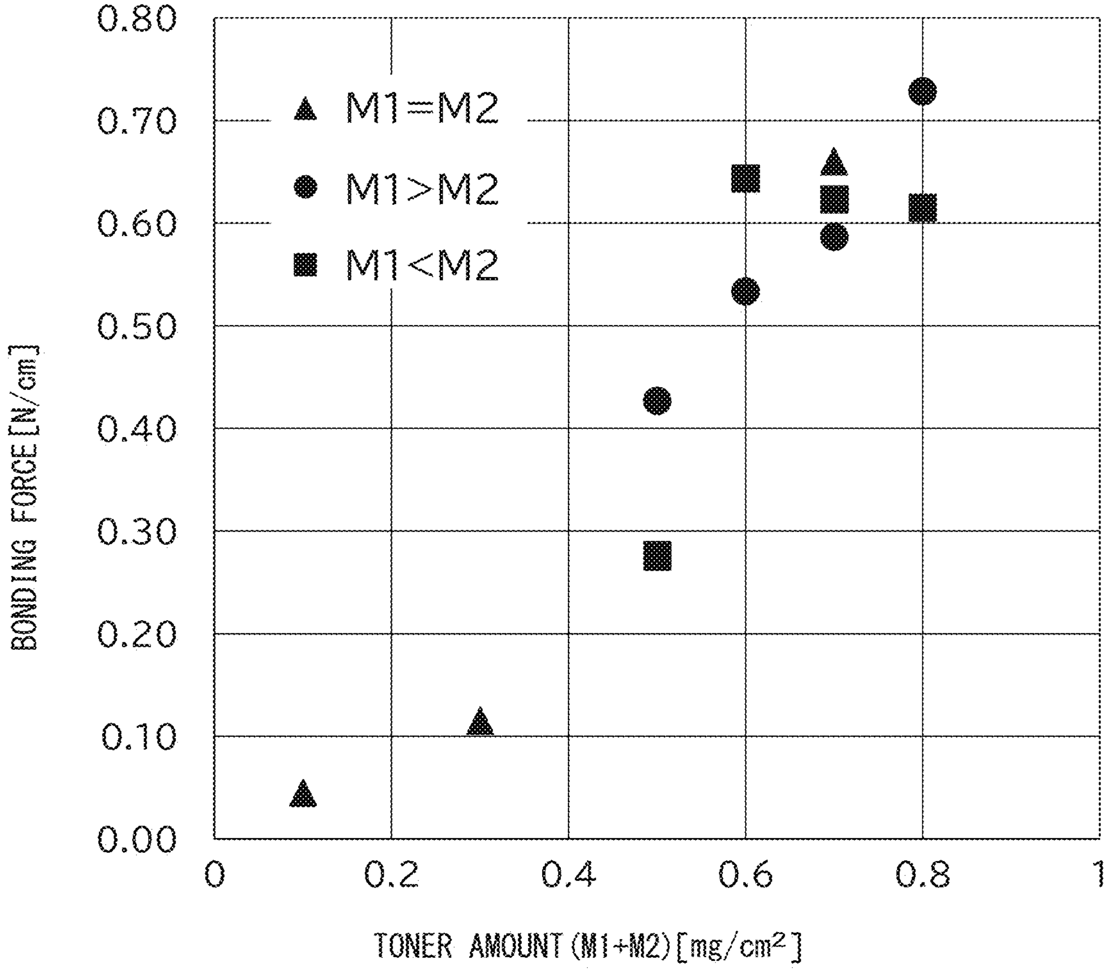
FIG. 9 is a diagram illustrating a relationship between the amount of bonding toner and bonding force on opposing surfaces of sheets.

The influence of change in the amount of the bonding toner Tn applied on surfaces (opposing surfaces) opposing each other of two sheets P to be bonded together on the bonding force was checked. FIG. 9 illustrates a result of checking the bonding force in conditions different in the magnitude relationship between an amount M1 of the bonding toner Tn applied on a surface (first surface) of one sheet P and an amount M2 of the bonding toner Tn applied on a surface (second surface) of the other sheet P to be bonded to the first surface. The measurement method for the bonding force was the same as that described with reference to FIGS. 6A and 6B. The horizontal axis of FIG. 9 indicates the sum of the amounts M1 and M2 of the bonding toner Tn on the first surface and the second surface.

As illustrated in FIG. 9, it has been confirmed that the value of the bonding force is mainly determined by the sum of the amounts M1 and M2 of the bonding toner Tn on the first surface and the second surface. In contrast, on which of the first surface and the second surface more bonding toner Tn is applied did not affect the value of the bonding force much.

Therefore, it is preferable that the amount of the bonding toner Tn applied on the surface (second surface) of the sheet P opposing the first surface is increased while reducing the amount of the bonding toner Tn applied on the surface (first surface) of the sheet P that comes into contact with the pressurizing plate 62 during the formation of the booklet. Specifically, it is preferable that the sum of amounts of the bonding toner Tn applied on the first surface and the second surface is approximately equal to or larger than the sum of amounts of the bonding toner Tn applied on the opposing surfaces of the sheets P that do not come into contact with the pressurizing plate 62. In the present embodiment, since 0.3 $mg/cm^2$ of the bonding toner Tn is applied on each of the opposing surfaces of the sheets P that do not come into contact with the pressurizing plate 62, it is preferable that the sum of the amounts of the bonding toner Tn applied on the first surface and the second surface is also set to 0.6 $mg/cm^2$. In other words, the sum of the amount of the bonding toner applied on the first surface and the amount of the bonding toner applied on the second surface is 0.6 $mg/cm^2$ or more in the present embodiment. In addition, the sum of amounts of the bonding toner applied on opposing surfaces of two adjacent sheets in the product other than the first surface and the second surface is 0.6 $mg/cm^2$ or more.

In addition, when reducing the amount of the bonding toner Tn on the first surface and increasing the amount of the bonding toner Tn on the second surface, it is preferable that the sheets P are bonded together by a sufficient bonding force. That is, it is preferable that the bonding force between the sheets by which the first surface and the second surface are bonded is 0.5 N/cm or more. In addition, it is preferable that the bonding force by which the opposing surfaces of two adjacent sheets in the product other than the first surface and the second surface are bonded is 0.5 N/cm or more. By setting the amount of the bonding toner applied on each sheet by the printer portion 1 in accordance with the characteristics of the bonding toner Tn such that such bonding force can be obtained, sufficient bonding force can be obtained for the booklet serving as a product.

To be noted, as described above, there is an upper limit in the toner amount of the toner image that can be developed by the single process cartridge 7*n*. In the process cartridge 7*n* of the present embodiment, the upper limit is about 0.5 $mg/cm^2$. In this case, the sum of the amounts of the bonding toner Tn applied on the first surface and the second surface is set to 0.6 $mg/cm^2$ while setting the amount of the bonding toner Tn applied on the second surface is set to 0.5 $mg/cm^2$ or less. As a result of this, the possibility of the bonding toner Tn attached to the pressurizing plate 62 in the heat-and-pressure bonding operation during the formation of the booklet staining the complete booklet can be lowered while avoiding the increase in the size and complexity of the image forming apparatus 1S.

The upper limit of the toner amount of the toner image that can be developed by the single process cartridge 7*n* can change depending on various conditions related to the developing step. Examples of these conditions include the types and outer diameters of the photosensitive drums, developing rollers, developing blades, and the like, the nature of the toner, the potential of the electrostatic latent image formed on the photosensitive drum, and potential settings of the photosensitive drum, developing roller, and developing blade. In addition, 0.5 $mg/cm^2$ that has been described as an example of the upper limit of the toner amount has been described as a value of the toner amount that can be used regardless of conditions varying for each user such as the use environment and use status of the image forming apparatus 1S and the sheet to be used.

Figure 10:
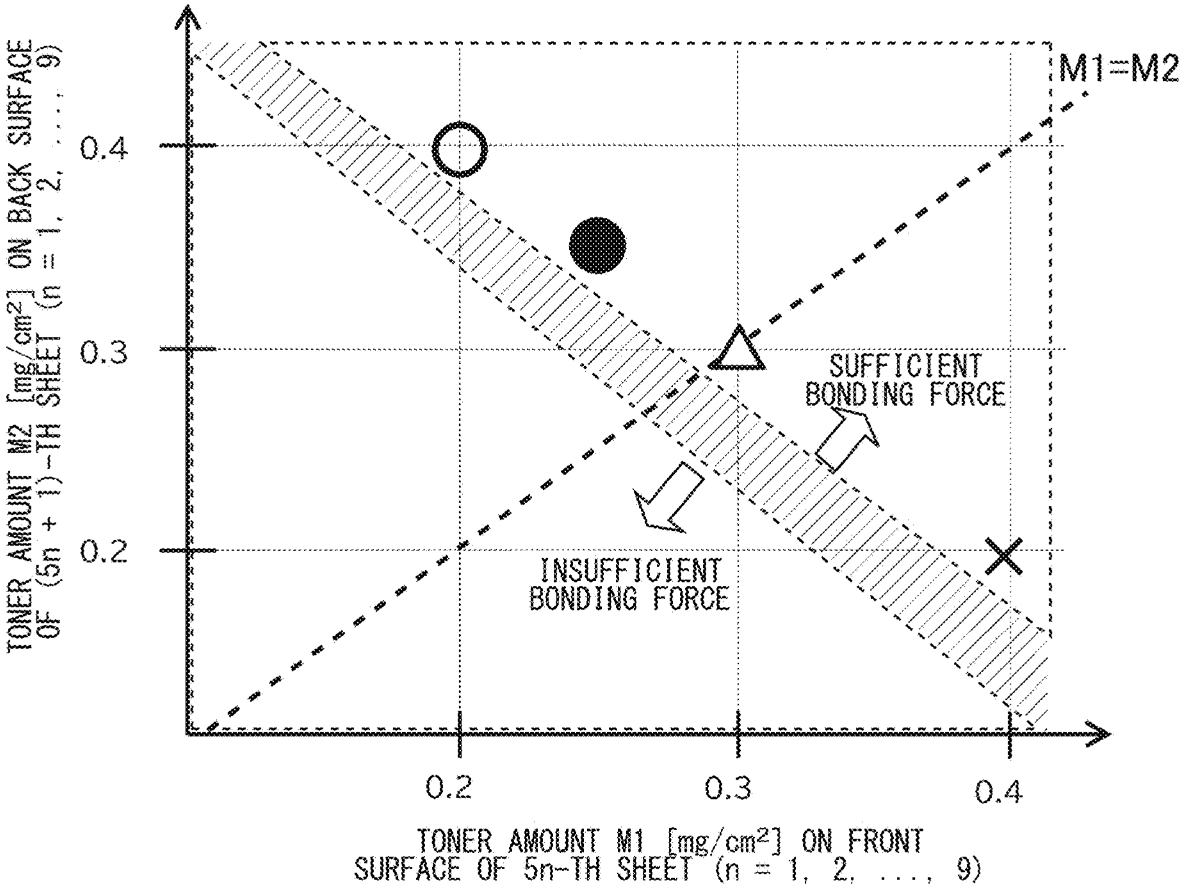
FIG. 10 is a diagram illustrating a relationship of the amount of bonding toner, the bonding force of completed booklet, and attachment of toner to the back cover in the first embodiment.

Next, whether the complete booklet is stained was checked while changing the amounts of the bonding toner Tn applied on the surface (first surface) of the sheet P that comes into contact with the pressurizing plate 62 during the formation of the booklet and the surface (second surface) of the sheet P opposing the first surface. FIG. 10 illustrates a result of checking the bonding force of the complete booklet and the attachment of the bonding toner Tn to the back cover of the booklet in the case of forming the booklet including fifty sheets P described with reference to FIGS. 7A to 7C. The checking was performed by evaluating the bonding force and the degree of toner attachment to the back cover by repeating the formation of the booklet a plurality of times.

The horizontal axis of FIG. 10 indicates the amount M1 of the bonding toner Tn applied on the front surface of the 5n-th sheet P (n=1, 2, . . . , 9) serving as an example of the surface (first surface) of the sheet P that comes into contact with the pressurizing plate 62 during the formation of the booklet. The vertical axis of FIG. 10 indicates the amount M2 of the bonding toner Tn applied on the back surface of the (5n+1)-th sheet P serving as an example of the surface (second surface) to be bonded to the first surface.

What the symbols in FIG. 10 represent will be described. The symbol "○" indicates that no toner attachment to the back cover of the complete booklet was recognized. The symbol "•" indicates that toner attachment that could not be visually recognized easily occurred, but the degree thereof was not deemed problematic. The symbol "Δ" indicates that toner attachment that can be visually recognized occurred at a degree that could be problematic. The symbol "×" indicates that the toner attachment could be immediately visually recognized.

In addition, in FIG. 10, the region on the upper-right side of a hatched region indicates that the sum of the amounts of the bonding toner Tn applied on the opposing surfaces of the sheets P is large, and a sufficient bonding force (0.5 N/cm or more) can be obtained in the complete booklet. The region on the lower-left side of the hatched region indicates that the sum of the amounts of the bonding toner Tn applied on the opposing surfaces of the sheets P is small and therefore the bonding force is smaller than 0.5 N/cm. The hatched region indicates that both a case where the bonding force is 0.5 N/cm or more and a case where the bonding force is less than 0.5 N/cm are included therein.

As illustrated in FIG. 10, toner attachment to the back cover of the booklet was reduced by setting the toner amount M1 on the front surface of the 5n-th sheet P that came into contact with the pressurizing plate 62 during the formation of the booklet to be smaller than the toner amount M2 on the back surface of the (5n+1)-th sheet P serving as an opposing surface (M1<M2). That is, it was confirmed that the stain on the booklet can be reduced by setting the amount of the bonding toner Tn applied on the surface (first surface) of the sheet P that comes into contact with the pressurizing plate 62 during the formation of the booklet to be smaller than the amount of the bonding toner Tn applied on the surface (second surface) of the sheet P to be bonded to the first surface.

In addition, it was confirmed that a sufficient bonding force can be obtained while reducing the stain on the booklet by setting the amounts M1 and M2 of the bonding toner Tn such that the sum of M1 and M2 is about 0.6 $mg/cm^2$ or more while maintaining the relationship of M1<M2. To be noted, since the standard for the sufficient bonding force can change in accordance with the application of the product as described above, at least a product on which stain is reduced can be obtained by the relationship of M1<M2 even if the sum of M1 and M2 is about 0.6 $mg/cm^2$.

In contrast, it was confirmed that toner attachment to the back cover of the booklet becomes more likely to occur if the toner amount M1 on the front surface of the 5n-th sheet P is set to be larger than the toner amount M2 on the back surface of the (5n+1)-th sheet P that is a surface opposing thereto (M1>M2). In addition, although a sufficient bonding force can be obtained by setting the amounts M1 and M2 of the bonding toner Tn such that the sum of M1 and M2 is about 0.6 $mg/cm^2$ or more, there was a case (×) that a stain that was easily visually recognizable was attached to the back cover of the complete booklet.

From the results described above, it can be seen that it is preferable that the toner amount M1 on the front surface of the 5n−th sheet P that comes into contact with the pressurizing plate 62 during the formation of the booklet is set to, for example, 0.2 $mg/cm^2$, and the toner amount M2 on the back surface of the (5n+1)-th sheet P serving as the opposing surface is set to, for example, 0.4 $mg/cm^2$. As a result of this, sufficient bonding force can be obtained while reducing the stain on the booklet.

As described above, the bonding portion of the present embodiment bonds the first surface of the uppermost sheet of the bonded sheet stack and the second surface of the succeeding sheet opposing the first surface are bonded by performing the next bonding operation in a state in which the succeeding sheet is stacked on the bonded sheet stack bonded in the previous bonding operation. As a result of this, a product in which sheets of a sheet number larger than the number of sheets that can be bonded in one bonding operation can be formed.

Further, the amount of the bonding toner applied on the first surface by the image forming portion is smaller than the amount of the bonding toner applied on the second surface by the image forming portion. As a result of this, attachment of the bonding toner to the heating pressurizing member in a bonding operation during the formation of the product can be suppressed, and the possibility of the bonding toner attached to the heating pressurizing member transferring onto the outer surface of the product and staining the outer surface in the final bonding operation can be lowered.

As described above, in the present embodiment, the amount of the bonding toner applied on the first surface of the sheet and the amount of the bonding toner applied on the second surface of the succeeding sheet to be bonded to the first surface can be changed to reduce the stain on the product. That is, according to the present embodiment, the toner amount at the bonded portion can be changed as necessary. That is, according to the present embodiment, an image forming apparatus capable of improving the quality of the sheet stack can be provided.

Modification Example

In the first embodiment, the amount of the bonding toner Tn applied on the surfaces of the sheet P other than the surface (first surface) of the sheet P that comes into contact with the pressurizing plate 62 during the formation of the booklet and the surface (second surface) of the sheet P opposing the first surface is constant (for example, 0.3 $mg/cm^2$). As a modification example, the amount of the bonding toner Tn applied on the front surface that is a surface opposing the pressurizing plate 62 may be set to be smaller than the amount of the bonding toner Tn applied on the back surface that is a surface not opposing the pressurizing plate 62 for all the sheets P included in the complete booklet. Here, the "surface opposing the pressurizing plate 62" is a surface where each sheet P opposes the pressurizing plate 62 in FIG. 8A, that is, the upper surface in the drawing, and the "surface not opposing the pressurizing plate 62" is a lower surface of each sheet P in the drawing.

In other words, in the present modification example, the amount of the bonding toner applied on the surface opposing the pressurizing member of each sheet by the image forming portion is smaller than the amount of the bonding toner applied on the surface on the side opposite to the surface opposing the pressurizing member of each sheet by the image forming portion. That is, the amount of the bonding toner applied on the opposing surface opposing the pressurizing member of each sheet by the image forming portion per unit area of the opposing surface is smaller than the amount of the bonding toner applied on an opposite surface that is on the opposite side to the opposing surface of each sheet by the image forming portion per unit area of the opposite surface. According to the present modification example, the toner amount at the bonded portion can be changed as necessary.

Since the amount of the bonding toner Tn on the front surface of each sheet P is smaller than the amount of the bonding toner Tn on the back surface, the amount of the bonding toner Tn on the surface (first surface) of the sheet P that comes into contact with the pressurizing plate 62 during the formation of the booklet is also smaller than the amount of the bonding toner Tn on the surface (second surface) of the sheet P opposing the first surface. Therefore, also in the present modification example, the stain on the complete booklet can be reduced similarly to the first embodiment.

In addition, the following advantages unique to the present modification can be also obtained. The sheet P used for the formation of the booklet is, in most cases, sheets P accommodated in the cassette 8 of the printer portion 1, and the temperature of the sheet P at the start of the image forming operation is a temperature close to the temperature (room temperature) of the installation environment in which the printer portion 1 is placed. After the toner images of the image toner and the bonding toner are transferred onto the sheet P configured in this manner, the fixing step is performed in the fixing unit 6, and thus the temperature of the sheet P increases. In the fixing step, heat necessary for melting the toner image, which varies depending on the type and amount of the toner, is applied to the sheet P. Therefore, in the fixing step, the temperature of the sheet P increases from the temperature close to the room temperature to a temperature of 80° C. to 120° C. The sheet P can curl when the temperature of the sheet P quickly increases in the fixing step as described above.

The mechanism of occurrence of the curl will be described. The sheet P contains moisture, and the amount of moisture varies depending on the temperature and humidity of the installation environment of the printer portion 1 and the material of the sheet P. Part of the moisture contained in the sheet P evaporates as vapor in the fixing step. However, the amount of the evaporating moisture differs between the front surface and the back surface of the sheet P. The curl of the sheet P is a phenomenon in which as a result of the difference in the amount of the evaporating moisture therebetween, the contraction amount of the front surface and the contraction amount of the back surface of the sheet P are different, and thus the sheet P curls such that the surface with the larger contraction amount is on the inside.

In the fixing step on the front surface of the sheet P, the temperature of the sheet P quickly increases from the temperature close to the room temperature to the temperature for the fixation, and therefore the difference in the amount of evaporating moisture between the front surface and the back surface of the sheet P is likely to be large. That is, the curl tends to be large in the fixing step on the front surface of the sheet P.

When the amount of the bonding toner Tn applied on the front surface of the sheet P is reduced, it becomes easier to obtain sufficient fixation even if the heat applied to the sheet Pin the fixing step on the front surface of the sheet P is reduced. Therefore, by reducing the heat applied to the sheet P in the fixing step on the front surface of the sheet P, the occurrence of the curl can be suppressed.

In contrast, in the fixing step on the back surface of the sheet P, the amount of moisture in the sheet P has been reduced in the fixing step on the front surface and the amount of newly evaporating moisture is small, and therefore the difference in the amount of evaporating moisture between the front surface and the back surface of the sheet P is small. In addition, since the temperature of the sheet P has increased to some extent in the fixing step on the front surface, the heat applied to the sheet P in the fixing step on the back surface may be smaller than in the fixing step on the front surface. Therefore, a large curl is not likely to occur even if the amount of the bonding toner Tn applied on the back surface of the sheet P is increased.

As described above, in the present modification example, the occurrence of the curl can be suppressed by setting the amount of the bonding toner Tn applied on the front surface to be smaller than the amount of the bonding toner Tn applied on the back surface for all the sheets P included in the complete booklet. As a result of this, the alignment of the sheets P in the booklet making apparatus 50 becomes easier, and thus a booklet having good alignment between the sheets can be formed.

Other Modification Examples

To be noted, although formation of the booklet by edge bonding (long-side binding) of sheets has been mainly described in the first embodiment, an effect similar to the first embodiment can be also obtained in the case of forming the booklet by corner bonding (corner binding) of sheets.

In addition, in the first embodiment, an example in which the surface of the sheet on which the toner image is formed earlier in the printer portion 1 serves as the surface opposing the pressurizing plate 62 in the booklet making apparatus 50 and the surface on which the toner image is formed later serves as the surface not opposing the pressurizing plate 62 in the booklet making apparatus 50 has been described. However, a configuration in which the surface of the sheet on which the toner image is formed earlier in the printer portion 1 serves as the surface not opposing the pressurizing plate 62 in the booklet making apparatus 50 and the surface on which the toner image is formed later serves as the surface opposing the pressurizing plate 62 in the booklet making apparatus 50 may be employed. Also in this case, an effect similar to the first embodiment can be obtained by setting the amount of the bonding toner Tn applied on the surface (first surface) of the sheet that comes into contact with the pressurizing plate 62 to be smaller than the amount of the bonding toner Tn applied on the surface (second surface) of the sheet opposing the first surface.

In addition, in the first embodiment and each modification example described above, the configuration in which "the amount of the bonding toner applied on the first surface by the image forming portion is smaller than the amount of the bonding toner applied on the second surface by the image forming portion" is realized by the difference in the amount of the bonding toner per unit area, but the configuration is not limited to this, and for example, the thickness of the layer of the bonding toner applied on the first surface by the image forming portion may be set to be smaller than the thickness of the layer of the bonding toner applied on the second surface by the image forming portion. Alternatively, the toner density of the layer of the bonding toner formed on the first surface by the image forming portion may be set to be lower than the toner density of the layer of the bonding toner formed on the second surface by the image forming portion. For example, the image coverage (ratio of an area covered by the bonding toner to the area of the bonding region) in the bonding region on the first surface is set to be lower than the image coverage in the bonding region on the second surface to be bonded to the bonding region on the first surface. In addition, in the case where the bonding toner is a colored toner including colorant, the "density" may be optical density. A similar effect to the first embodiment can be also obtained by these modification examples.

Second Embodiment

As a second embodiment, a configuration in which one type of toner is used as both the image toner and the bonding toner will be described. By using one type of toner as both the image toner and the bonding toner, the sheet bonding function can be relatively easily imparted by using the configuration of a monochromatic image forming apparatus. In addition, in the second embodiment, a configuration in which different toner amounts are set for the image region and the bonding region on the sheet will be described. To be noted, also in the first embodiment, the bonding toner Tn may be colored black, and the black color may be expressed by the bonding toner Tn instead of the process black. In this case, not only a sheet bonding function can be imparted by still using the configuration of a color image forming apparatus, but also the amount of toner consumption when expressing black can be reduced.

In the description below, it is assumed that elements denoted by the same reference signs as in the first embodiment have substantially the same configuration and function as those described in the first embodiment unless otherwise described, and parts different from the first embodiment will be mainly described.

Overall Configuration of Image Forming Apparatus

Figure 12:
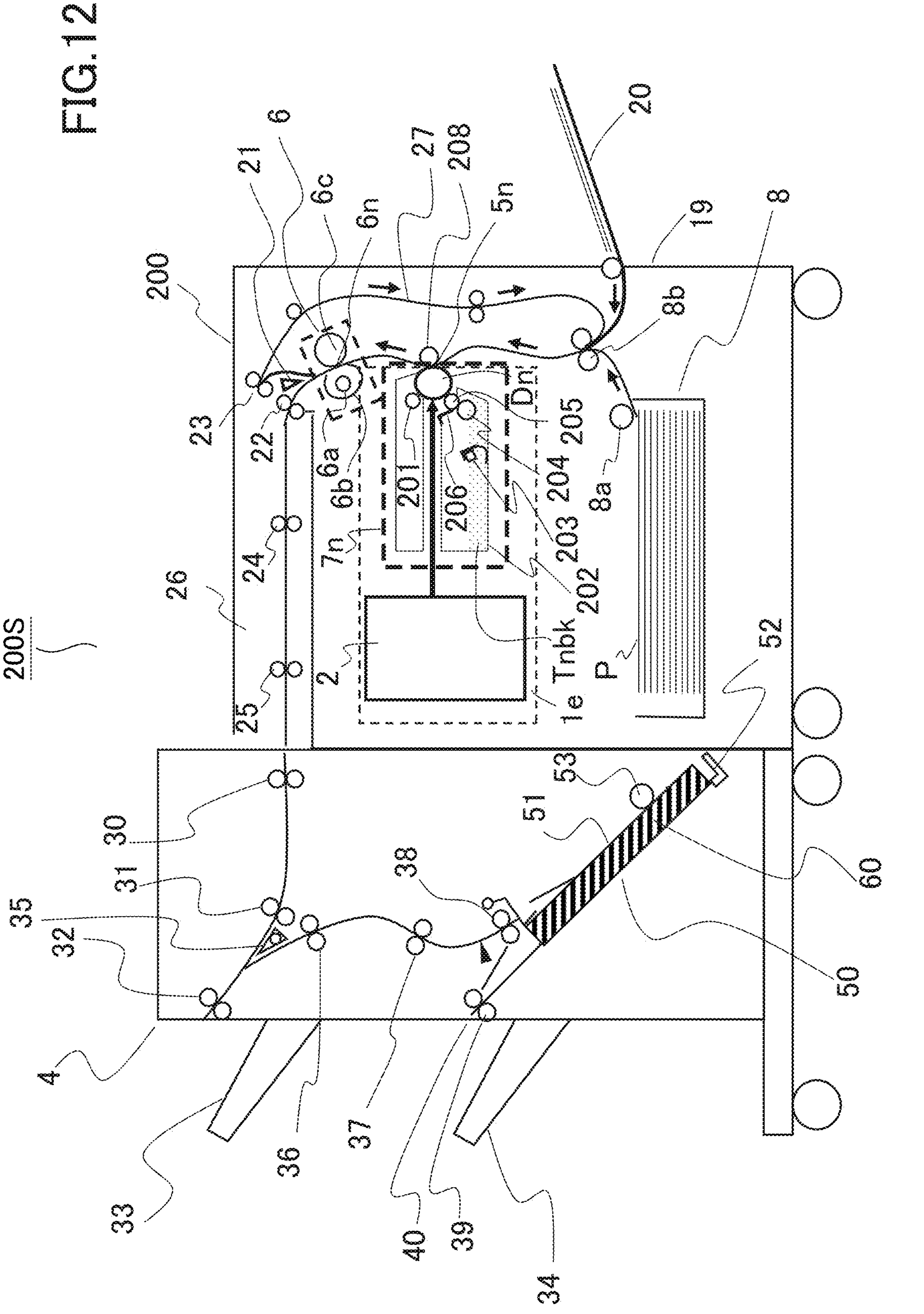
FIG. 12 is a schematic view of an image forming apparatus according to the second embodiment.

FIG. 12 is a schematic view of an image forming apparatus 200S according to the second embodiment. The image forming apparatus 200S includes a printer portion 200 including an image forming unit 1*e*, an intermediate conveyance unit 26 coupled to the printer portion 1, and a post-processing apparatus 4.

The image forming unit 1*e* of the present embodiment is an electrophotographic unit of a direct transfer system including one process cartridge 7*n* (enclosed by a thick broken line), a scanner unit 2, and a transfer unit 208 (transfer roller). The process cartridge 7*n* includes a photosensitive drum Dn serving as an image bearing member, a charging roller 201, and a developing unit. The charging roller 201 functions as a charging portion that charges the photosensitive drum Dn. The developing unit includes a toner accommodating portion 202 accommodating toner Tnbk serving as developer, a developing roller 205 serving as a developer bearing member that bears the toner, and a supply member 204 that supplies the toner to the developing roller 205. The developing unit further includes an agitating member 203 that agitates the toner Tnbk, and a regulating member 206 (developing blade) that regulates the amount of the toner Tnbk borne on the developing roller 205.

The process cartridge 7*n* forms a visible image by using the colored toner Tnbk, and forms a toner image for applying the toner Tnbk in a predetermined bonding pattern on the sheet P. In the present embodiment, the toner Tnbk is colored black. The toner image formed on the photosensitive drum Dn in the process cartridge 7*n* is transferred from the photosensitive drum Dn onto the sheet P in a transfer nip 5*n* by the transfer unit 208.

To be noted, three process cartridges of yellow, magenta, and cyan may be provided in addition to the black process cartridge 7*n* to form a color image forming apparatus. In addition, the yellow toner may be used as the bonding toner. In this case, the application region of the bonding toner becomes less visually recognizable, and thus the texture of the product can be improved. The configuration is not limited to this, and the types and number of the toner can be changed in accordance with the application of the image forming apparatus 200S.

In the process cartridge 7*n*, the photosensitive drum Dn, the charging roller 201, and the developing unit may be disposed in one unit. In addition, in the process cartridge 7*n*, for example, the photosensitive drum Dn and the charging roller 201 may be disposed in a unit (drum unit) different from the developing unit, and each unit may be individually attachable to and detachable from a casing 19.

In the present embodiment, when a print instruction including image data is input, a controller 107 that will be described later causes the image forming unit 1*e* to form a toner image (hereinafter referred to as a normal image) based on the image data in a predetermined region on the sheet P. In addition, in the case where the print instruction includes a setting to form a product in which sheets P are bonded together in the booklet making apparatus 50, the controller 107 adds additional data for applying the toner Tnbk in a predetermined bonding pattern on the sheet P to the image data. Then, the controller 107 causes the image forming unit 1*e* to form a toner image (hereinafter referred to as a bonding toner image) based on the additional data.

In the description below, a region on the photosensitive drum Dn in which a toner image for forming a normal image on the sheet P is formed will be referred to as an "image region". In addition, a region on the photosensitive drum Dn in which a toner image for forming a bonding toner image on the sheet P is formed will be referred to as a "bonding region". In the present embodiment, the image region and the bonding region are regions separate from each other in the main scanning direction of the scanner unit 2. That is, the bonding toner of the present embodiment is the same as the toner used for forming an image in the image region. In addition, the image forming portion of the present embodiment forms the bonding toner image in the bonding region on the sheet by using the toner, and forms an image in the image region different from the bonding region on the sheet by using the toner. In addition, in the description below, a region on the sheet P corresponding to the image region on the photosensitive drum Dn will be also referred to as an "image region" of the sheet P, and a region on the sheet P corresponding to the bonding region on the photosensitive drum Dn will be also referred to as a "bonding region" of the sheet P.

Scanner Unit

Figure 14:
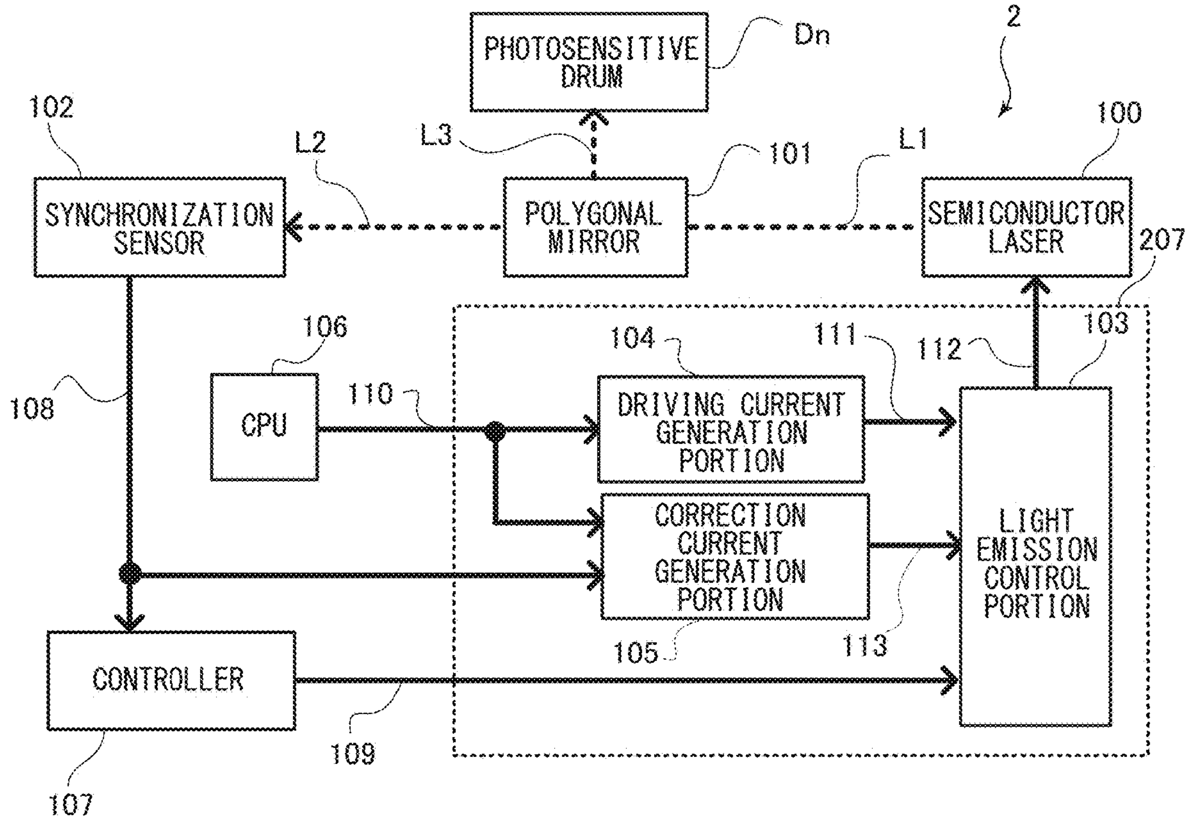
FIG. 14 is a diagram illustrating a driving circuit of a scanner unit according to the second embodiment.

A laser driving circuit incorporated in the scanner unit 2 will be described. FIG. 14 is a block diagram illustrating an electric circuit of a laser driving circuit 207.

The scanner unit 2 is an example of an exposing portion that forms an electrostatic latent image by performing exposure by irradiating the photosensitive drum Dn with light. The scanner unit 2 includes a semiconductor laser 100 serving as a light source, a polygonal mirror 101, a synchronization sensor 102, and the laser driving circuit 207. The laser driving circuit 207 includes a light emission control portion 103, a driving current generation portion 104, and a correction current generation portion 105.

A CPU 106 of the present embodiment performs serial communication with the driving current generation portion 104 and the correction current generation portion 105 via a serial communication signal 110. The driving current generation portion 104 outputs a laser driving current amount signal 111 on the basis of information transmitted from the CPU 106, and controls the current amount of the laser driving current 112. The correction current generation portion 105 outputs, in synchronization with a main scanning synchronization signal 108, a correction current amount signal 113 on the basis of the current amount information in a main scanning position transmitted from the CPU 106. The laser driving current 112 is controlled to a current amount obtained by subtracting a current amount based on the correction current amount signal 113 from a current amount based on the laser driving current amount signal 111.

Therefore, in the present embodiment, the amount of light radiated from the scanner unit 2 onto the photosensitive drum Dn changes in accordance with the position in the main scanning direction.

In addition, an image signal 109 transmitted from the controller 107 is generated on the basis of data obtained by adding the additional data for generating the bonding toner image to the data for generating the normal image (image data input together with the print instruction).

Bonding Toner

As the toner Tnbk of the present embodiment, toner containing thermoplastic resin and colorant can be used. The resin that can be used as the thermoplastic resin is not particularly limited, and examples thereof include polyester resin, vinyl resin, acrylic resin, and styrene acrylic resin similarly to known image toners. A plurality of these resins may be included. The toner Tnbk may contain a magnetic body, a charge control agent, a wax, an external additive, and the like.

The toner Tnbk is colored black. In the case of configuring the image forming apparatus 200S as a color image forming apparatus, the toner Tnbk may be colored a different color such as yellow, magenta, cyan, or the like. In addition, in the case of using the image forming apparatus 200S as a monofunctional sheet bonding apparatus having only the bonding function and not forming the normal image, the toner Tnbk may be configured as transparent toner without coloring.

Exposure Control

The exposure control of the scanner unit 2 will be described with reference to FIGS. 15A and 15B. In the description below, it is assumed that a bonding toner image is formed at an edge portion of a long side of each surface of each sheet P excluding the sheet surfaces to be the front cover and the back cover of the booklet as illustrated in FIG. 5B.

Figure 15B:
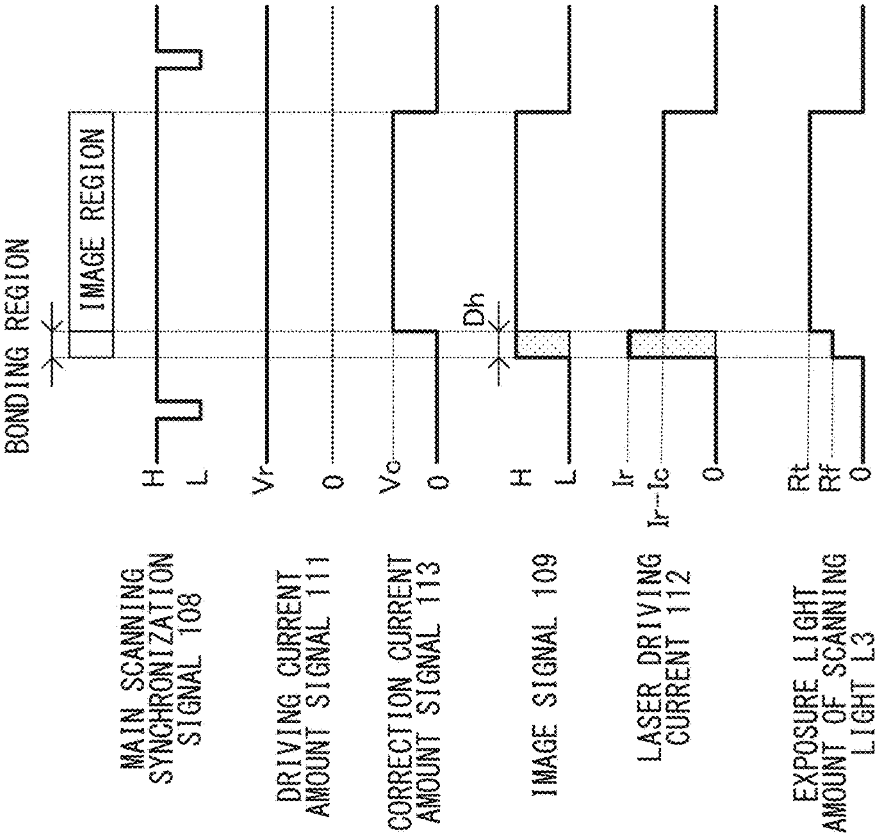
FIGS. 15A and 15B are each a timing chart illustrating exposure control according to the second embodiment.
Figure 15A:
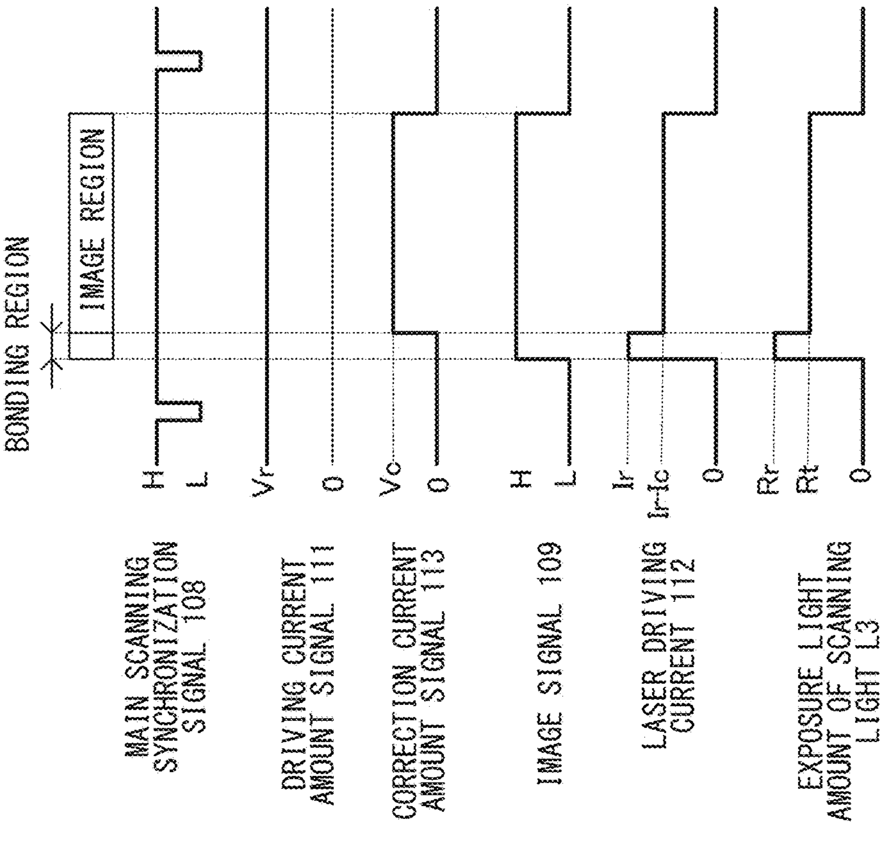

FIG. 15A illustrates an exposure light amount at each position in the main scanning direction when forming a bonding toner image and a normal image on the back surface of the sheet P. The laser driving current 112 when the value of the laser driving current amount signal 111 is Vr [V] and the value of the correction current amount signal 113 is 0 [V] is denoted by Ir. The laser driving current 112 when the value of the laser driving current amount signal 111 is Vr [V] and the value of the correction current amount signal 113 is Vc [V] is a value (Ir-Ic) that is smaller than Ir. The correction current amount signal 113 changes from 0 [V] to Vc after a predetermined time from a falling edge of the main scanning synchronization signal 108.

While the image signal 109 is High, the laser driving current 112 flows in the semiconductor laser 100. Therefore, in the period in which the image signal 109 is High, the current of Ir flows in the semiconductor laser 100 in a section where the value of the correction current amount signal 113 is 0, and the current of (Ir-Ic) flows in the semiconductor laser 100 in a section where the value of the correction current amount signal 113 is Vc.

The section where the value of the correction current amount signal 113 is 0 corresponds to the bonding region on the photosensitive drum Dn, and the section where the value of the correction current amount signal 113 is Vc corresponds to the image region on the photosensitive drum Dn. Therefore, the exposure light amount of scanning light L3 radiated from the semiconductor laser 100 onto the photosensitive drum Dn via the polygonal mirror 101 (FIG. 14) is a light amount Rr(μJ/cm$^2$) corresponding to the current amount Ir when scanning the bonding region. In addition, the exposure light amount of scanning light L3 is a light amount Rt (μJ/cm$^2$) corresponding to the current amount (Ir-Ic) when scanning the image region.

As described above, the width of the bonding region can be set by the output timings of the image signal 109 and the correction current amount signal 113. In addition, by changing the voltage Vr of the laser driving current amount signal 111 and the voltage Vc of the correction current amount signal 113, the exposure light amount in the image region and the bonding region can be changed. Since the bonding toner image is formed on the back surface of the sheet P, High is output for the image signal 109 all the time in a period in which the bonding region is scanned. The exposure light amount of the scanning light L3 is a light amount Rt in the image region, and is, in the bonding region, a light amount Rr larger than the light amount Rt.

The controller 107 that outputs the image signal 109 and the correction current generation portion 105 that outputs the correction current amount signal 113 are examples of a light amount correcting portion that corrects the light amount of the scanning light L3 emitted from the exposing unit. Rr is a light amount when the region on the photosensitive drum Dn corresponding to the bonding region on the back surface (second surface) of the sheet P opposing the front surface (first surface) of the sheet P that comes into contact with the pressurizing plate 62 during the formation is scanned by the scanning light L3. Rrf is a light amount when the region on the photosensitive drum Dn corresponding to the image region on the second surface is scanned by the scanning light L3. The controller 107 of the present embodiment corrects the light amount of the scanning light L3 in accordance with the position in the main scanning direction such that Rr>Rgr is satisfied. As a result of this, the magnitude relationship of the toner amount between the bonding region and the image region (Mr<Mgr) can be realized.

As described above in the present embodiment, the toner amount (toner deposition amount) per unit area in the bonding region on the sheet and the toner amount (toner deposition amount) per unit area in the image region can be changed by changing the light amount during exposure. That is, according to the present embodiment, the toner amount at the bonded portion can be changed as necessary. As a result of this, the toner amount in the bonding region can be set independently from the image region on the basis of other indices such as the bonding force between sheets or reduction of the stain on the product while setting the toner amount such that the image density and toner consumption amount in the image region are good.

To be noted, the toner amount of an image formed on the sheet P in the case of inputting image data of a solid image (so-called black solid image) of a density of 100% to the image forming apparatus 200S is set as the standard for the toner amount in the image region.

FIG. 15B illustrates the exposure light amount at each position in the main scanning direction when forming the bonding toner image and the normal image on the front surface of the sheet P. For the image signal 109, since the bonding toner image is formed on the front surface of the sheet P, a PWM signal (pulse width-modulated signal) corresponding to a density Dh lower than the density of 100% is output in the period of scanning the bonding region (dotted region in the drawing). The laser driving current 112 is repeatedly switched on and off in accordance with the image signal 109 of the density Dh. The exposure light amount of the scanning light L3 is a light amount Rt in the image region, and is a light amount Rf(μJ/cm$^2$) smaller than the light amount Rt in the bonding region.

The controller 107 that outputs the image signal 109 is an example of a light amount correcting portion that corrects the light amount of the scanning light L3 emitted from the exposing unit. Rf is a light amount when the region on the photosensitive drum Dn corresponding to the bonding region on the front surface (first surface) of the sheet P that comes into contact with the pressurizing plate 62 during the formation is scanned by the scanning light L3. Rgf is a light amount when the region on the photosensitive drum Dn corresponding to the image region on the first surface is scanned by the scanning light L3. The controller 107 of the present embodiment corrects the light amount of the scanning light L3 in accordance with the position in the main scanning direction such that Rf<Rgf is satisfied. As a result of this, the magnitude relationship of the toner amount between the bonding region and the image region (Mf<Mgf) can be realized.

Toner Amount of Normal Image/Bonding Toner Image of Front Surface/Back Surface

Figure 16:
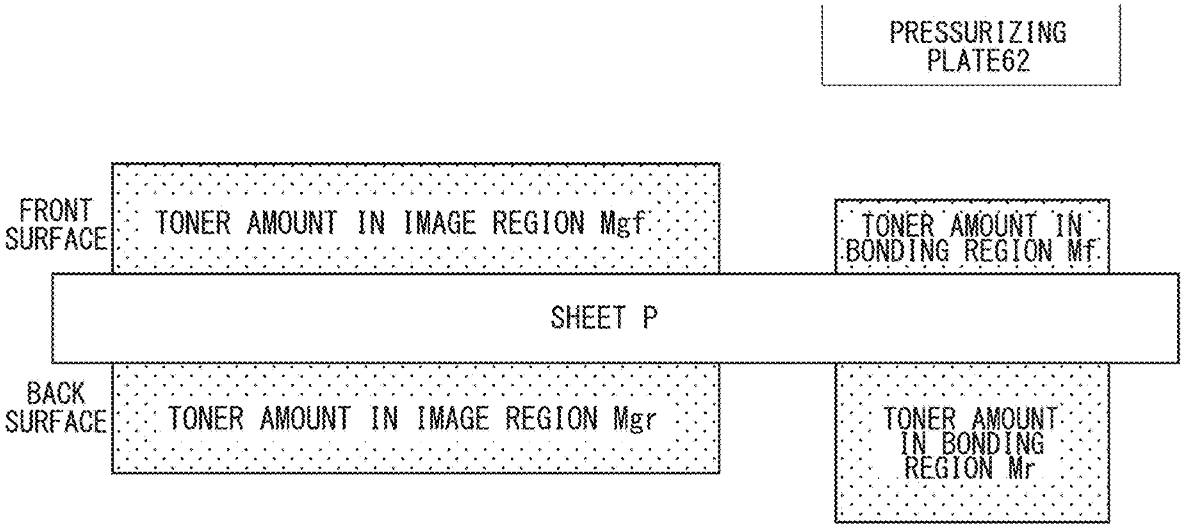
FIG. 16 is a schematic diagram illustrating a relationship of toner amounts on a sheet according to the second embodiment.

In the present embodiment, the relationship of the toner amounts of the normal image and the bonding toner image formed on each of the front surface and the back surface of each sheet P will be described with reference to FIG. 16. FIG. 16 is a schematic view of the sheet P on which the normal image and the bonding toner image are formed by the printer portion 200 of the present embodiment.

Similarly to the first embodiment, a surface (upper surface) of the sheet P opposing the pressurizing plate 62 in the booklet making apparatus 50 will be referred to as a "front surface", and a surface (surface of the sheet P not opposing the pressurizing plate 62) on the opposite side to the front surface will be referred to as a "back surface" of the sheet P. The toner amount in the image region on the front surface of the sheet P is denoted by Mgf, the toner amount in the bonding region on the front surface is denoted by Mf, the toner amount in the image region on the back surface is denoted by Mgr, and the toner amount in the bonding region on the back surface is denoted by Mr. Each toner amount is an amount of the toner Tnbk before receiving the fixing process in the fixing unit 6, and is expressed by toner weight per unit area (unit: $Mg/cm^2$).

As in the first embodiment, as a method to make a difference between the toner amount Mf in the bonding region on the front surface and the toner amount Mr in the bonding region on the back surface, uniformly changing the toner amount in the entire region in the main scanning direction on the photosensitive drum Dn can be considered. Specifically, there are a method of increasing and decreasing the amount of toner borne on the developing roller 205 by controlling the regulating member 206 and the supply member 204, and a method of increasing and decreasing the amount of toner to be developed on the photosensitive drum Dn by controlling the peripheral speed difference between the photosensitive drum Dn and the developing roller 205. However, by these methods, not only the toner amounts Mf and Mr in the bonding region but also the toner amounts Mgf and Mgr in the image region also increase and decrease. That is, by these methods, the toner amount can increase and decrease in accordance with the sub-scanning direction of the scanner unit 2, but the toner amount cannot be changed in accordance with the position in the main scanning direction.

In the present embodiment, as described in "Exposure Control", the exposure light amount can be changed in accordance with the position in the main scanning direction by controlling the correction current amount signal 113 output to the scanner unit 2. As a result of this, the toner amount can be changed in accordance with the position in the main scanning direction at the same position in the sub-scanning direction, that is, between the bonding region and the image region. Specifically, as illustrated in FIG. 16, on the front surface of the sheet P, the toner amount Mf in the bonding region can be made smaller than the toner amount Mgf in the image region (Mf<Mgf). As a result of this, a high-quality image balanced in the density and consumption amount in the image region on the front surface can be formed while reducing the stain on the booklet caused by toner attachment. In addition, on the back surface of the sheet P, the toner amount Mr in the bonding region can be made larger than the toner amount Mgr in the image region (Mr>Mgr). As a result of this, a high-quality image balanced in the density and consumption amount in the image region on the front surface can be formed while obtaining good bonding force.

To be noted, an example in which the toner amount Mf in the bonding region on the front surface of one sheet P is smaller than the toner amount Mr in the bonding region on the back surface has been described with reference to FIG. 16. This corresponds to a case where the toner amount Mf in the bonding region on the front surface of the sheet P is made smaller than the toner amount Mr in the bonding region on the back surface for all the sheets P including the complete booklet as in the modification example of the first embodiment. As described in the first embodiment, if the toner amount Mf in the bonding region on the front surface (first surface) of the sheet P that comes into contact with the pressurizing plate 62 during the formation of the booklet is smaller than the toner amount Mr on the back surface (second surface) of the sheet P opposing the first surface, the stain on the booklet caused by toner attachment can be reduced. To be noted, if the toner amount Mf in the bonding region on the first surface is smaller than the toner amount Mr on the second surface, the toner amount in the bonding region on the surface of the sheet P other than the first surface and the second surface may be the same as the toner amounts Mgf and Mgr in the image region. The stain on the booklet caused by toner attachment can be also reduced by this configuration.

Figure 13:
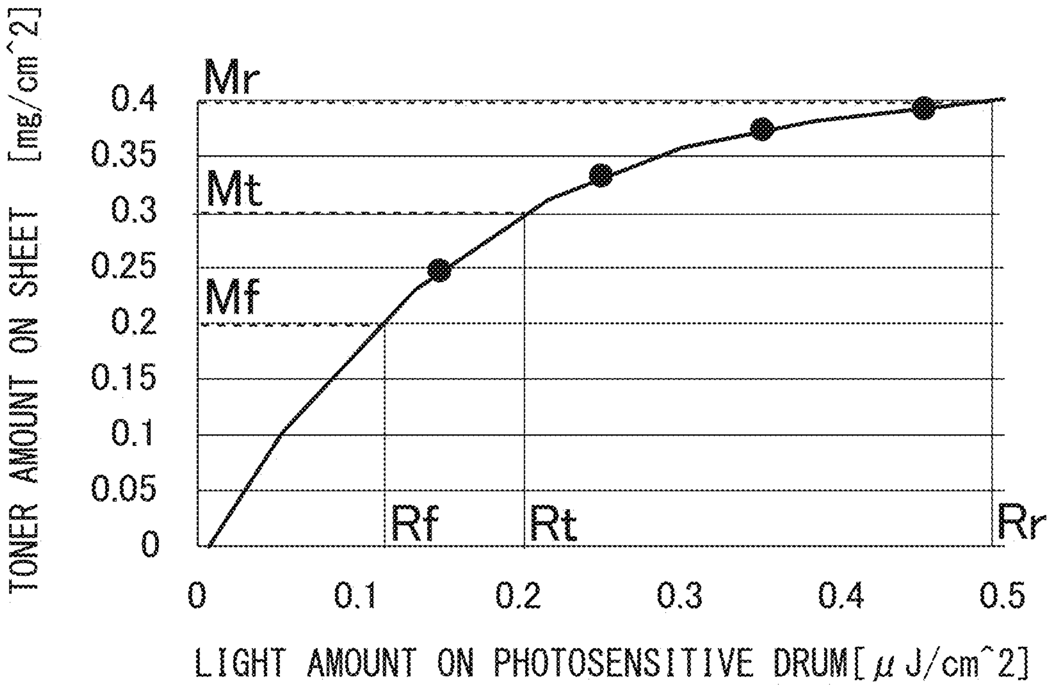
FIG. 13 is a diagram illustrating a relationship between the exposure light amount and the toner amount in the second embodiment.

FIG. 13 is a graph illustrating the relationship between the exposure light amount R ($\mu J/cm^2$) on the photosensitive drum Dn and the toner amount on the sheet P. The horizontal axis indicates the exposure light amount on the photosensitive drum Dn, and the vertical axis indicates the toner amount on the sheet P. From the viewpoint of the bonding force and the toner attachment to the pressurizing plate 62, the toner amounts in the bonding regions on the front surface and the back surface of the sheet P are preferably set to, for example, Mf=0.20 ($mg/cm^2$) and Mr=0.40 ($mg/cm^2$) for the same reason as that described in the first embodiment. To realize these toner amounts Mf and Mr, the light amount Rf for scanning the region on the photosensitive drum Dn corresponding to the bonding region on the front surface of the sheet P is set to be smaller than the light amount Rr for scanning the region on the photosensitive drum Dn corresponding to the bonding region on the back surface of the sheet P(Rf<Rr).

In addition, for example, if Mt=0.30 ($mg/cm^2$) is set for the toner amounts Mgf and Mgr in the image region, a high-quality image balanced in the toner density and the toner consumption amount can be obtained. To realize this toner amount Mt, the light amount Rt for scanning the photosensitive drum Dn for forming the normal images on the front surface and the back surface of the sheet P is set to be larger than the light amount Rf for scanning the photosensitive drum Dn for forming the bonding toner image on the front surface. In addition, the light amount Rt is set to be smaller than the light amount Rr for scanning the photosensitive drum Dn for forming the bonding toner image on the back surface.

Comparative Example 1

Comparative Example 1 has a configuration in which only the bonding toner Tn is changed from the configuration of the first embodiment to the toner Tnbk of the second embodiment. Therefore, the exposure light amount cannot be changed in accordance with the position in the main scanning direction.

In the configurations of Comparative Example 1 and the second embodiment, a booklet including fifty sheets P was formed a plurality of times as described with reference to FIGS. 7A to 7C in the first embodiment, and the bonding force, the toner attachment to the pressurizing plate 62, the toner density, and the toner consumption amount were compared. Table 1 shows the relationship between the exposure light amount R and the toner amount M on the sheet P at this time and the evaluation result of each evaluation item.

the pressurizing plate 62 were good. However, in Comparative Example 1, since the toner amount Mgf in the image region on the front surface and the toner amount Mf in the bonding region on the front surface were both 0.2 mg/cm$^2$ and were smaller than the toner amount 0.3 mg/cm$^2$ with which a high-quality image balanced in the density and the consumption amount can be obtained, and thus lack of density occurred. In Comparative Example 1, the toner amount Mgf in the image region on the front surface was small, and therefore the consumption amount was small. In addition, in Comparative Example 1, since the toner amount Mgr in the image region on the back surface was 0.4 mg/cm$^2$ equal to the toner amount Mr in the bonding region on the back surface and was larger than the appropriate toner amount 0.3 mg/cm$^2$, the density was sufficient but the consumption amount was large.

In contrast, in the first embodiment, the exposure light amount is changed in accordance with the position in the main scanning direction, that is, changed to Rf in the bonding region on the front surface, Rr in the bonding region on the back surface, and Rt in the image regions on the front surface and the back surface. As a result of this, the toner amount Mf in the bonding region on the front surface is set

TABLE 1

| | Printed Surface | Scanning Region | Light Amount R | Toner Amount M | Bonding Force | Toner Attachment | Density | Consumption Amount |
|---|---|---|---|---|---|---|---|---|
| Comparative Example 1 | Front Surface | Normal Image Portion | Rf | 0.20 | B | B | F | A |
| | | Bonded Portion | Rf | 0.20 | | | | |
| | Back Surface | Normal Image Portion | Rr | 0.40 | | | A | F |
| | | Bonded Portion | Rr | 0.40 | | | | |
| Second Embodiment | Front Surface | Normal Image Portion | Rt | 0.30 | B | B | B | B |
| | | Bonded Portion | Rf | 0.20 | | | | |
| | Back Surface | Normal Image Portion | Rt | 0.30 | | | B | B |
| | | Bonded Portion | Rr | 0.40 | | | | |

The bonding force between the sheets P was measured by the same method as that described with reference to FIG. 6B in the first embodiment, and 0.5 N/cm or more is indicated by B, and less than 0.5 N/cm is indicated by F. The determination standard of toner attachment to the pressurizing plate 62 conforms to the first embodiment. Regarding the density, a case of a density when the toner amount M on the sheet P is a standard value (0.30 mg/cm$^2$) is indicated by B, a case of a density lower than the standard value is indicated by F, and a case of a density higher than the standard value is indicated by A. Regarding the consumption amount, a case of a consumption amount when the toner amount M on the sheet P is a standard value (0.30 mg/cm$^2$) is indicated by B, a case where the consumption amount is larger than the standard value is indicated by F, and a case where the consumption amount is smaller than the standard value is indicated by A.

In Comparative Example 1, the toner amount Mf in the bonding region on the front surface was set to 0.2 mg/cm$^2$, and the toner amount Mr in the bonding region on the back surface was set to 0.4 mg/cm$^2$. In this case, the results of the bonding force and the reduction of the toner attachment to to 0.2 mg/cm$^2$, the toner amount Mr in the bonding region on the back surface is set to 0.4 mg/cm$^2$, the toner amounts Mgf and Mgr in the image regions on the front surface and the back surface are set to 0.3 mg/cm$^2$. As a result of this, a high-quality image further balanced in the density and the consumption amount can be obtained while obtaining a good result in the bonding force and the reduction of the toner attachment to the pressurizing plate 62.

Modification Example

To be noted, although the exposure light amount in the bonding region on the front surface is controlled to the light amount Rf by changing the PWM of the image signal 109 in the present embodiment, the configuration is not limited to this. The exposure light amount in the bonding region may be set to be smaller than that in the image region by setting a voltage larger than the voltage Vc as the correction current amount signal 113 output to the bonding region. Alternatively, by combining on and off of the semiconductor laser 100 on the per scanning unit basis (per laser spot basis), the exposure light amount in the bonding region can be virtually reduced.

In addition, in the present embodiment, a configuration example (FIG. 16) in which Mf<Mgf and Mr>Mgr are satisfied to reduce the stain on the product (booklet) similarly to the first embodiment has been described. The configuration is not limited to this, and for example, the bonding force between sheets may be increased by setting the toner amount in the bonding region to be larger than the toner amount in the image region (Mf>Mgf and Mr>Mgr) for the front surface and the back surface of each sheet P. In addition, for example, for the front surface and the back surface of each sheet P, the toner amount in the bonding region may be set to be smaller than the toner amount in the image region (Mf<Mgf and Mr<Mgr).

Third Embodiment

In the present embodiment, an image forming apparatus that can change the size of the sheet P to be used for forming the booklet will be described. It is assumed that the bonding toner image of the present embodiment is formed at a long-side edge portion as illustrated in FIG. 5B in a region of 2 mm to 5 mm from an end portion of the sheet P in the main scanning direction (Y direction).

In the description below, it is assumed that elements denoted by the same reference signs as in the first and second embodiments have substantially the same configuration and function as those described in the first and second embodiments unless otherwise described, and parts different from the first and second embodiments will be mainly described.

Overall Configuration of Image Forming Apparatus

The overall configuration of the image forming apparatus 200S according to the third embodiment is the same as that described in the second embodiment (FIG. 12) described above. To be noted, in the image forming apparatus 200S, the sheet P is conveyed such that the image center position subjected to scanning exposure by the scanner unit 2 coincides with the center position of the sheet P. The other elements are the same as in the second embodiment, and thus the description thereof will be omitted.

Exposure Control

Exposure control of the present embodiment will be described with reference to FIGS. 17A and 17B. FIG. 17A illustrates an exposure light amount with respect to the position in the main scanning direction when forming a bonding toner image on the back surface of a sheet P of the A4 size. Similarly to the second embodiment, the image signal 109 is High in the bonding region for forming the bonding toner image. The output of the image signal 109 is started after the elapse of a time tg4 from the falling edge of the main scanning synchronization signal 108, and data including the image data for forming the normal image and additional data for forming the bonding toner image is output. In addition, the output of the correction current amount signal 113 is started after the elapse of a time tr4 from the falling edge of the main scanning synchronization signal 108.

The time after the elapse of the time tg4 from the falling edge is a time at which a position on the photosensitive drum Dn corresponding to a position at 2 mm from an end portion in the Y direction of the sheet P of the A4 size is scanned by the scanning light L3. In addition, the time after the elapse of the time tr4 from the falling edge is a time at which a position on the photosensitive drum Dn corresponding to a position at 5 mm from an end portion in the Y direction of the sheet P of the A4 size is scanned by the scanning light L3. By setting the times tg4 and tr4 in this manner, a light amount profile corresponding to the sheet P of the A4 size can be set. That is, a region on the photosensitive drum Dn corresponding to the bonding region on the sheet P of the A4 size can be exposed by the light amount Rr, and a region on the photosensitive drum Dn corresponding to the image region on the sheet P of the A4 size can be exposed by the light amount Rt.

Figure 17B:
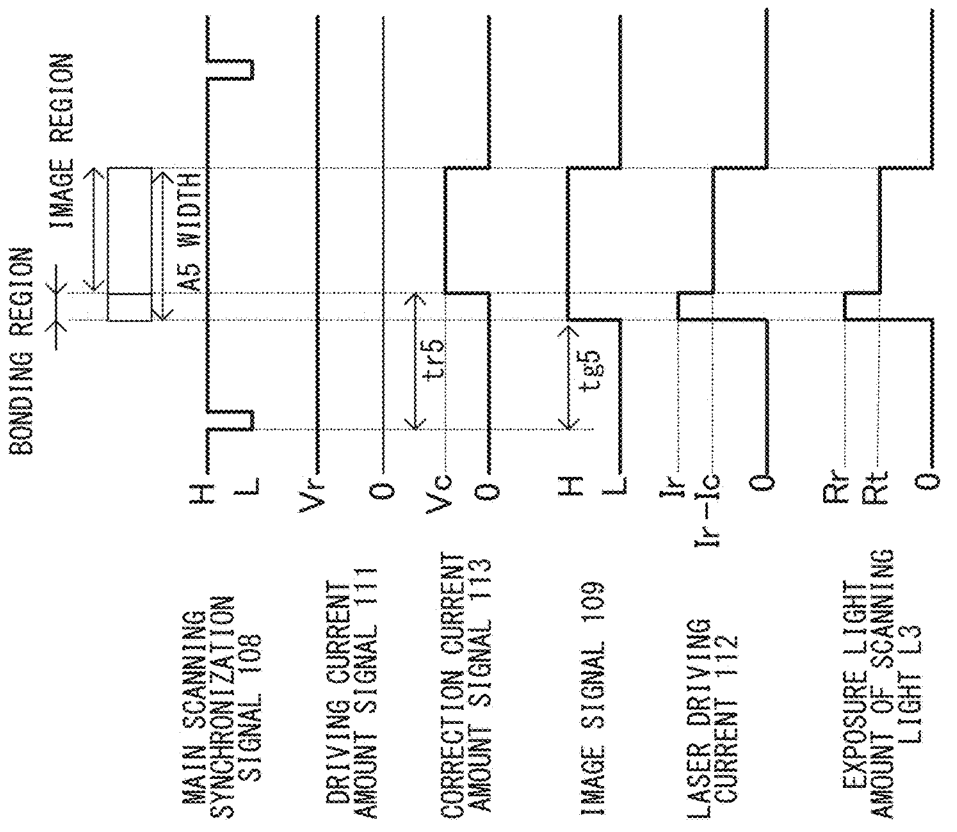
FIGS. 17A and 17B are each a timing chart illustrating exposure control according to the third embodiment.
Figure 17A:
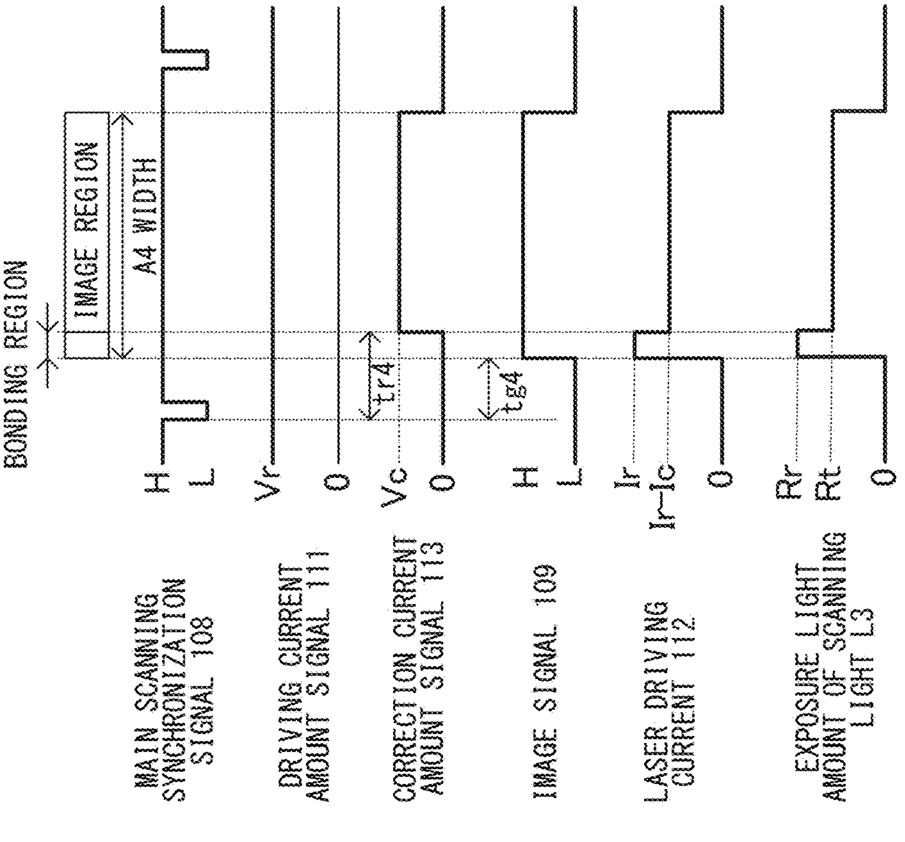

FIG. 17B illustrates an exposure light amount with respect to the position in the main scanning direction when forming a bonding toner image on the back surface of a sheet P of the A5 size. The output of the image signal 109 is started after the elapse of a time tg5 from the falling edge of the main scanning synchronization signal 108, and data including the image data for forming the normal image and additional data for forming the bonding toner image is output. In addition, the output of the correction current amount signal 113 is started after the elapse of a time tr5 from the falling edge of the main scanning synchronization signal 108.

The control of the exposure light amount when forming a bonding toner image on the back surface of the sheet P of the A4 size is substantially the same as that of the front surface except that the PWM control is preformed such that the density is a density Dh lower than the density of 100% in a region on the photosensitive drum Dn corresponding to the bonding region of the sheet P (see FIG. 15B).

The time after the elapse of the time tg5 from the falling edge is a time at which a position on the photosensitive drum Dn corresponding to a position at 2 mm from an end portion in the Y direction of the sheet P of the A5 size is scanned by the scanning light L3. In addition, the time after the elapse of the time tr5 from the falling edge is a time at which a position on the photosensitive drum Dn corresponding to a position at 5 mm from an end portion in the Y direction of the sheet P of the A5 size is scanned by the scanning light L3. By setting the times tg5 and tr5 in this manner, a light amount profile corresponding to the sheet P of the A5 size can be set. That is, a region on the photosensitive drum Dn corresponding to the bonding region on the sheet P of the A5 size can be exposed by the light amount Rr, and a region on the photosensitive drum Dn corresponding to the image region on the sheet P of the A5 size can be exposed by the light amount Rt.

The control of the exposure light amount when forming a bonding toner image on the back surface of the sheet P of the A5 size is substantially the same as that of the front surface except that the PWM control is preformed such that the density is a density Dh lower than the density of 100% in a region on the photosensitive drum Dn corresponding to the bonding region of the sheet P (see FIG. 15B).

As described above, in the present embodiment, the controller 107 and the correction current generation portion 105 serving as a light amount correcting portion selectively uses a plurality of light amount profiles in accordance with the size of the sheet in the main scanning direction. The plurality of light amount profiles are profiles different in the range irradiated with the scanning light L3 by the light amount Rr or Rf in the main scanning direction, and are determined in advance in accordance with the size of the sheet.

According to the present embodiment, the toner amount (toner deposition amount) per unit area in the bonding region on the sheet and the toner amount (toner deposition amount) per unit area in the image region can be changed by changing the light amount during exposure. That is, according to the present embodiment, the toner amount at the bonded portion can be changed as necessary. In addition, according to the present embodiment, by adjusting the change timing of the exposure light amount in accordance with the size of the sheet P, an effect similar to the first and second embodiments can be obtained in the booklet making apparatus 50 capable of forming a booklet by using sheets P of various sizes.

Fourth Embodiment

In the present embodiment, a configuration in which the exposure light amount can be changed between the bonding region and the image region similarly to the second embodiment even in a laser driving circuit configuration in which changing the laser driving current in accordance with the position in the main scanning direction is difficult as in the first embodiment.

In the description below, it is assumed that elements denoted by the same reference signs as in the first to third embodiments have substantially the same configuration and function as those described in the first to third embodiments unless otherwise described, and parts different from the first to third embodiments will be mainly described.

The overall configuration of the image forming apparatus 200S according to the fourth embodiment is the same as that described in the second embodiment (FIG. 12) described above. The laser driving circuit incorporated in the scanner unit 2 according to the fourth embodiment is the same as that of the first embodiment (FIG. 11)

Exposure Control

The exposure control of the scanner unit 2 of the present embodiment will be described with reference to FIGS. 18A and 18B. In the description below, similarly to the modification example of the first embodiment, it is assumed that the bonding toner image is formed at a long-side edge portion as in FIG. 5B on each surface of each sheet P excluding the sheet surface to be the front cover or the back cover of the booklet.

Figure 18A:
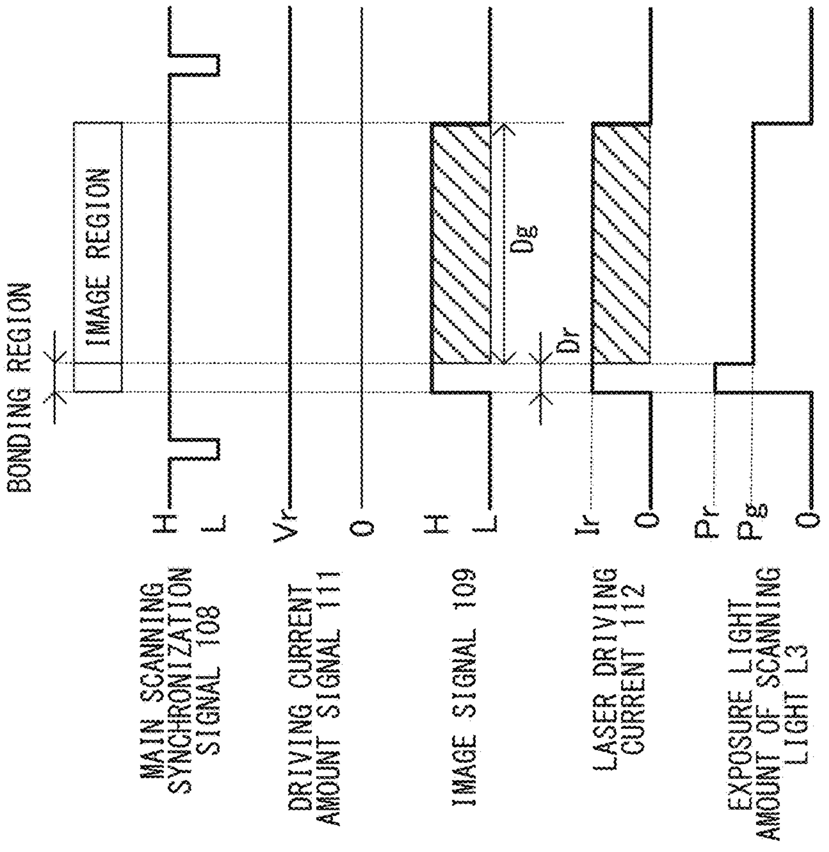
FIGS. 18A and 18B are each a timing chart illustrating exposure control according to the fourth embodiment.

FIG. 18A illustrates exposure light amount with respect to the position in the main scanning direction when forming the bonding toner image and the normal image on the back surface of the sheet P. The image signal 109 is controlled to a PWM signal (first PWM signal value) corresponding to a density Dr in a period in which a region on the photosensitive drum Dn corresponding to the bonding region on the back surface of the sheet P is scanned. For description, the density Dr is set to 100%. In addition, the image signal 109 is controlled to a PWM signal (second PWM signal value) corresponding to a density Dg lower than the density Dr in a period in which a region on the photosensitive drum Dn corresponding to the image region on the back surface of the sheet P is scanned. Therefore, even in the case where the user transmits image data of a fully-covered black image (solid black image of a density of 100%) together with the print instruction, the controller 107 corrects the image data of the image region on the per dot basis such that the density of the normal image is the density Dg. Even in the case where the user transmits image data other than the fully-covered black image, the controller 107 corrects the image data by the same rate as the density Dg.

The laser driving current 112 is repeatedly turned on and off in accordance with the image signal 109 corresponding to the density Dr in the bonding region and the density Dg in the image region. As a result of this, the region on the photosensitive drum Dn corresponding to the bonding region on the back surface of the sheet P is scanned by the scanning light L3 of a light amount Pr, and the region on the photosensitive drum Dn corresponding to the image region on the back surface of the sheet P is scanned by the scanning light L3 of a light amount Pg smaller than the light amount Pr of the bonding region.

Figure 18B:
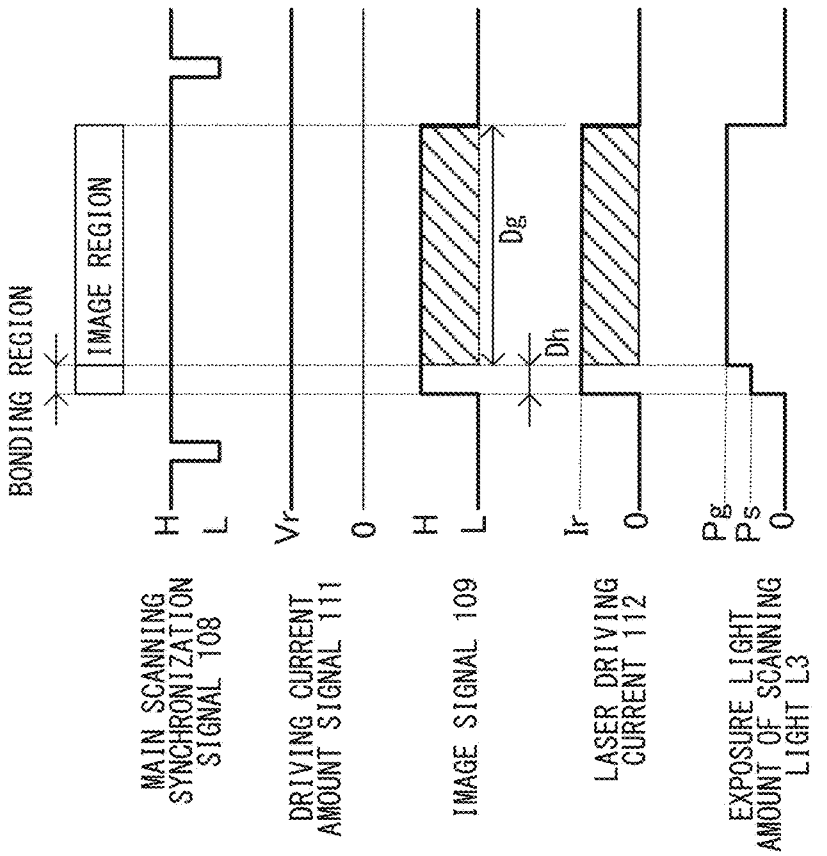

FIG. 18B illustrates exposure light amount with respect to the position in the main scanning direction when forming the bonding toner image and the normal image on the front surface of the sheet P. The image signal 109 is controlled to a PWM signal (third PWM signal value) corresponding to a density Dh lower than the density Dg of the image region in a period in which a region on the photosensitive drum Dn corresponding to the bonding region on the front surface of the sheet P is scanned. In addition, the image signal 109 is controlled to the PWM signal (second PWM signal value) corresponding to the density Dg in a period in which a region on the photosensitive drum Dn corresponding to the image region on the front surface of the sheet P is scanned.

The laser driving current 112 is repeatedly turned on and off in accordance with the image signal 109 corresponding to the density Dh in the bonding region and the density Dg in the image region. As a result of this, the region on the photosensitive drum Dn corresponding to the bonding region on the front surface of the sheet P is scanned by the scanning light L3 of a light amount Ps smaller than the light amount Pg of the image region, and the region on the photosensitive drum Dn corresponding to the image region on the front surface of the sheet Pis scanned by the scanning light L3 of the light amount Pg.

As described above, the controller 107 serving as a light amount correcting portion of the present embodiment corrects the light amount of the scanning light L3 emitted from the scanner unit 2 by the pulse width modulation of the image signal 109.

According to the present embodiment, the toner amount in the bonding region and the toner amount in the image region on the sheet P can be independently controlled in accordance with the position in the main scanning direction even in the configuration in which the laser driving current is not changed in accordance with the position in the main scanning direction. Therefore, an effect similar to the first embodiment can be obtained by setting the amount of the bonding toner Tn applied on the surface (first surface) of the sheet P that comes into contact with the pressurizing plate 62 during the formation of the booklet to be smaller than the amount of the bonding toner Tn applied on the surface (second surface) of the sheet P opposing the first surface.

According to the present embodiment, the toner amount (toner deposition amount) per unit area of the bonding region on the sheet and the toner amount (toner deposition amount) per unit area of the image region can be changed by changing the light amount during exposure. That is, according to the present embodiment, the toner amount at the bonded portion can be changed as necessary. In addition, by changing the control time of the image signal 109 and the correction current amount signal 113 in accordance with the size of the sheet P similarly to the third embodiment, an effect similar to the third embodiment can be obtained.

As described above, according to the present disclosure, an image forming apparatus that can change the toner amount at the bonded portion as necessary can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-086347, filed on May 25, 2023, which is hereby incorporated by reference herein in its entirety.

What is claimed is:

1. An image forming apparatus for forming a toner image on a sheet and forming a booklet with a plurality of sheets bonded together, the image forming apparatus comprising:

an image forming portion configured to form the toner image and a bonding toner pattern on the sheet; and a bonding portion including a pressurizing member and configured to bond sheets together via the bonding toner pattern by performing a bonding operation of pressurizing and heating the plurality of sheets by the pressurizing member, wherein the bonding portion is configured to, in a state in which a succeeding sheet is stacked on a plurality of sheets that has been bonded in a previous bonding operation, perform a next bonding operation to bond a first surface of an uppermost sheet of the bonded plurality of sheets to a second surface of the succeeding sheet opposing the first surface, the next bonding operation and the previous bonding operation each being the bonding operation, and wherein the image forming portion is configured to form the bonding toner pattern of a solid pattern on the first surface and on the second surface, such that an amount of toner per unit area within the bonding toner pattern on the first surface is smaller than an amount of the toner per unit area within the bonding toner pattern on the second surface.

2. The image forming apparatus according to claim 1, wherein the image forming portion is configured to form the bonding toner pattern on both surfaces of each sheet to be included in the booklet, except a first sheet of the booklet and a last sheet of the booklet, and wherein for the first sheet and the last sheet, the image forming portion is configured to form the bonding toner pattern only on a surface that faces an interior of the booklet.

3. The image forming apparatus according to claim 2, wherein a sum of the amount of the toner per unit area within the bonding toner pattern on the first surface and the amount of the toner per unit area within the bonding toner pattern on the second surface is 0.6 $mg/cm^2$ or more, and wherein a total amount of the toner per unit area of the bonding toner patterns formed on opposing surfaces of two adjacent sheets in the booklet other than the first surface and the second surface is 0.6 $mg/cm^2$ or more.

4. The image forming apparatus according to claim 2, wherein the image forming portion is configured to form the bonding toner pattern on each sheet included in the booklet such that a bonding force between sheets bonded to each other via the first surface and the second surface is 0.5 N/cm or more, and that a bonding force between two adjacent sheets in the booklet bonded to each other via opposing surfaces thereof other than the first surface and the second surface is 0.5 N/cm or more.

5. The image forming apparatus according to claim 1, wherein the image forming portion is configured to form the bonding toner pattern of the solid pattern over a bonding region on the sheet by using the toner, and form the toner image in an image region on the sheet different from the bonding region by using the toner.

6. The image forming apparatus according to claim 5, wherein in a case where a toner amount in the bonding region on the first surface is Mf ($mg/cm^2$) and a toner amount in the image region on the first surface is Mgf ($mg/cm^2$), the image forming portion is configured to form the toner image and the bonding toner pattern on the first surface such that a relationship $Mf<Mgf$ is satisfied.

7. The image forming apparatus according to claim 6, wherein the image forming portion includes an image bearing member, an exposing unit configured to emit scanning light scanning the image bearing member in a main scanning direction, and a light amount correcting portion configured to correct a light amount of the scanning light, and wherein in a case where an exposure light amount for scanning a region on the image bearing member corresponding to the bonding region on the first surface by the scanning light is Rf($\mu J/cm^2$) and an exposure light amount for scanning a region on the image bearing member corresponding to the image region on the first surface by the scanning light is Rgf($\mu J/cm^2$), the light amount correcting portion is configured to correct the light amount of the scanning light in accordance with a position in the main scanning direction such that $Rf<Rgf$ is satisfied.

8. The image forming apparatus according to claim 7, wherein the light amount correcting portion is configured to selectively use a plurality of light amount profiles in accordance with a size of a sheet in the main scanning direction, the plurality of light amount profiles being different from each other in a range in the main scanning direction irradiated with the scanning light at the light amount of Rf.

9. The image forming apparatus according to claim 7, wherein the exposing unit includes a light source, and wherein the light amount correcting portion is configured to correct the light amount of the scanning light by changing an amount of current supplied to the light source.

10. The image forming apparatus according to claim 7, wherein the exposing unit includes a light source, and wherein the light amount correcting portion is configured to correct the light amount of the scanning light by modulating a current supplied to the light source by pulse width modulation.

11. The image forming apparatus according to claim 5, wherein in a case where a toner amount in the bonding region on the second surface is Mr (mg/$cm^2$) and a toner amount in the image region on the second surface is Mgr (mg/$cm^2$), the image forming portion is configured to form the toner image and the bonding toner pattern on the second surface such that a relationship Mr>Mgr is satisfied.

12. The image forming apparatus according to claim 11, wherein the image forming portion includes an image bearing member, an exposing unit configured to emit scanning light scanning the image bearing member in a main scanning direction, and a light amount correcting portion configured to correct a light amount of the scanning light, and wherein in a case where an exposure light amount for scanning a region on the image bearing member corresponding to the bonding region on the second surface by the scanning light is Rr(μJ/$cm^2$) and an exposure light amount for scanning a region on the image bearing member corresponding to the image region on the second surface by the scanning light is Rrf(μJ/$cm^2$), the light amount correcting portion is configured to correct the light amount of the scanning light in accordance with a position in the main scanning direction such that Rr>Rrf is satisfied.

13. The image forming apparatus according to claim 12, wherein the light amount correcting portion is configured to selectively use a plurality of light amount profiles in accordance with a size of a sheet in the main scanning direction, the plurality of light amount profiles being different from each other in a range in the main scanning direction irradiated with the scanning light at the light amount of Rr.

14. The image forming apparatus according to claim 1, wherein the bonding portion is configured to perform the bonding operation once each time one succeeding sheet is stacked on the bonded plurality of sheets.

15. The image forming apparatus according to claim 1, wherein the bonding portion is configured to perform the bonding operation once each time a predetermined number of succeeding sheets are stacked on the bonded plurality of sheets.

16. The image forming apparatus according to claim 15, further comprising:

a supporting portion configured to support the plurality of sheets to be bonded by the bonding portion;

an alignment mechanism configured to align a sheet conveyed to the supporting portion to a position for performing the bonding operation; and a stacking portion configured to stack the predetermined number of sheets conveyed thereto one by one from the image forming portion and convey a stack of the predetermined number of sheets toward the supporting portion.

17. The image forming apparatus according to claim 1, wherein the image forming portion is configured to form the bonding toner pattern along one of edges of a sheet, and wherein the bonding portion is configured to form the booklet in which sheets are bonded at the edge on which the bonding toner pattern is formed.

18. The image forming apparatus according to claim 1, wherein the image forming portion is configured to form the bonding toner pattern on one of corner portions of a sheet, and wherein the bonding portion is configured to form the booklet in which sheets are bonded at the corner portion on which the bonding toner pattern is formed.

19. An image forming apparatus for forming a toner image on a sheet and forming a booklet with a plurality of sheets bonded together, the image forming apparatus comprising:

an image forming portion configured to form the toner image and a bonding toner pattern on the sheet; and a bonding portion configured to bond sheets together via the bonding toner pattern by pressurizing and heating the plurality of sheets, wherein the image forming portion is configured to form the bonding toner pattern on both surfaces of each sheet of the booklet, except a first sheet of the booklet and a last sheet of the booklet, the surfaces including a first surface and a second surface backside of the first surface, wherein the image forming portion is configured to form the toner image in an image region on the sheet by using toner, and form the bonding toner pattern in a bonding region on the sheet different from the image region by using the toner, wherein the image forming portion is configured to form the bonding toner pattern of a solid pattern on the first surface and on the second surface such that:

a toner amount per unit area in the bonding region on the first surface is different from a toner amount per unit area in the image region on the first surface, and a toner amount per unit area in the bonding region on the second surface is different from a toner amount per unit area in the image region on the second surface.

20. The image forming apparatus according to claim 19, wherein the image forming portion includes an image bearing member, an exposing unit configured to emit scanning light scanning the image bearing member in a main scanning direction, and a light amount correcting portion configured to correct a light amount of the scanning light, and wherein the light amount correcting portion is configured to correct the light amount of the scanning light in accordance with a position in the main scanning direction such that the light amount of the scanning light differs between a case where the scanning light scans a region on the image bearing member corresponding to the image region and a case where the scanning light scans a region on the image bearing member corresponding to the bonding region.

21. The image forming apparatus according to claim 19, wherein in a case where the toner amount per unit area in the bonding region on the first surface is Mf (mg/$cm^2$), the toner amount per unit area in the bonding region on the second surface is Mr (mg/$cm^2$), the toner amount per unit area in the image region on the first surface is Mgf (mg/$cm^2$), and the toner amount per unit area in the image region on the second surface is Mgr (mg/cm$^2$), the image forming portion is configured to form the toner image and the bonding toner pattern on the first surface and the second surface such that:

a relationship Mf<Mgf is satisfied for the first surface, and a relationship Mr>Mgr is satisfied for the second surface.

22. The image forming apparatus according to claim 21, wherein the image forming portion includes an image bearing member, an exposing unit configured to emit scanning light scanning the image bearing member in a main scanning direction, and a light amount correcting portion configured to correct a light amount of the scanning light, and wherein in a case where an exposure light amount for scanning a region on the image bearing member corresponding to the bonding region on the first surface by the scanning light is Rf(μJ/cm$^2$) and an exposure light amount in scanning a region on the image bearing member corresponding to the image region on the first surface by the scanning light is Rgf(μJ/cm$^2$), the light amount correcting portion corrects the light amount of the scanning light in accordance with a position in the main scanning direction such that Rf<Rgf is satisfied.

23. The image forming apparatus according to claim 22, wherein the light amount correcting portion is configured to selectively use a plurality of light amount profiles in accordance with a size of a sheet in the main scanning direction, the plurality of light amount profiles being different from each other in a range in the main scanning direction irradiated with the scanning light at the light amount of Rf.

24. The image forming apparatus according to claim 21, wherein the image forming portion includes an image bearing member, an exposing unit configured to emit scanning light scanning the image bearing member in a main scanning direction, and a light amount correcting portion configured to correct a light amount of the scanning light, and wherein in a case where an exposure light amount for scanning a region on the image bearing member corresponding to the bonding region on the second surface by the scanning light is Rr(μJ/cm$^2$) and an exposure light amount for scanning a region on the image bearing member corresponding to the image region on the second surface by the scanning light is Rrf(μJ/cm$^2$), the light amount correcting portion corrects the light amount of the scanning light in accordance with a position in the main scanning direction such that Rr>Rrf is satisfied.

25. The image forming apparatus according to claim 24, wherein the light amount correcting portion is configured to selectively use a plurality of light amount profiles in accordance with a size of a sheet in the main scanning direction, the plurality of light amount profiles being different from each other in a range in the main scanning direction irradiated with the scanning light at the light amount of Rr.

26. A sheet bonding apparatus for forming a booklet with a plurality of sheets bonded together, the sheet bonding apparatus comprising:

an application portion configured to form a bonding toner pattern on a sheet by using toner; and a bonding portion including a pressurizing member and configured to bond sheets together via the bonding toner pattern by performing a bonding operation of pressurizing and heating a plurality of sheets by the pressurizing member, wherein the bonding portion is configured to, in a state in which a succeeding sheet is stacked on a plurality of sheets that has been bonded in a previous bonding operation, perform a next bonding operation to bond a first surface of an uppermost sheet of the bonded plurality of sheets to a second surface of the succeeding sheet opposing the first surface, the next bonding operation and the previous bonding operation each being the bonding operation, and wherein the application portion is configured to form the bonding toner pattern of a solid pattern on the first surface and on the second surface, such that an amount of the toner per unit area within the bonding toner pattern on the first surface is smaller than an amount of the toner per unit area within the bonding toner that the application portion applies pattern on the second surface.

27. An image forming apparatus for forming a toner image on a sheet and forming a booklet with a plurality of sheets bonded together, the image forming apparatus comprising:

an image forming portion configured to form the toner image and a bonding toner pattern on the sheet; and a bonding portion including a pressurizing member and configured to bond sheets together via the bonding toner pattern by performing a bonding operation of pressurizing and heating the plurality of sheets by the pressurizing member, wherein the bonding portion is configured to, in a state in which a succeeding sheet is stacked on a plurality of sheets bonded in a previous bonding operation, perform a next bonding operation to bond a first surface of an uppermost sheet of the bonded plurality of sheets to a second surface of the succeeding sheet opposing the first surface, the next bonding operation and the previous bonding operation each being the bonding operation, and wherein the image forming portion is configured to form the bonding toner pattern of a solid pattern on the first surface and on the second surface, such that a toner density of the bonding toner pattern on the first surface is lower than a toner density of the bonding toner pattern on the second surface.

28. The image forming apparatus according to claim 27, wherein the image forming portion is configured to form the bonding toner on both surfaces of each sheet to be included in the booklet, except a first sheet of the booklet and a last sheet of the booklet, and wherein for the first sheet and the last sheet, the image forming portion is configured to form the bonding toner pattern only on a surface that faces an interior of the booklet.

29. An image forming apparatus for forming a toner image on a sheet and forming a booklet with a plurality of sheets bonded together, the image forming apparatus comprising:

an image forming portion configured to form the toner image and a bonding toner pattern on the sheet; and a bonding portion including a pressurizing member and configured to bond sheets together via the bonding toner pattern by performing a bonding operation of pressurizing and heating the plurality of sheets by the pressurizing member, wherein the bonding portion is configured to, in a state in which a succeeding sheet is stacked on a plurality of sheets bonded in a previous bonding operation, perform a next bonding operation to bond a first surface of an uppermost sheet of the bonded plurality of sheets to a second surface of the succeeding sheet opposing the first surface, the next bonding operation and the previous bonding operation each being the bonding operation, and wherein the image forming portion is configured to form the bonding toner pattern of a solid pattern on the first surface and on the second surface, such that a thickness of a layer of the bonding toner pattern on the first surface is smaller than a thickness of a layer of the bonding toner pattern on the second surface.

30. The image forming apparatus according to claim 29, wherein the image forming portion is configured to form the bonding toner pattern on both surfaces of each sheet to be included in the booklet, except a first sheet of the booklet and a last sheet of the booklet, and wherein for the first sheet and the last sheet, the image forming portion is configured to form the bonding toner pattern only on a surface that faces an interior of the booklet.

* * * * *